United States Patent
Kawano et al.

(10) Patent No.: US 10,746,650 B2
(45) Date of Patent: Aug. 18, 2020

(54) REFLECTION CHARACTERISTIC MEASURING DEVICE

(71) Applicant: KONICA MINOLTA, INC., Chiyoda-ku (JP)

(72) Inventors: Toshio Kawano, Sakai (JP); Takashi Kawasaki, Sakai (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/301,966

(22) PCT Filed: May 24, 2017

(86) PCT No.: PCT/JP2017/019395
§ 371 (c)(1),
(2) Date: Nov. 15, 2018

(87) PCT Pub. No.: WO2017/208937
PCT Pub. Date: Dec. 7, 2017

(65) Prior Publication Data
US 2019/0285540 A1 Sep. 19, 2019

(30) Foreign Application Priority Data

May 31, 2016 (JP) .................... 2016-108282

(51) Int. Cl.
*G01N 21/25* (2006.01)
*G01N 21/27* (2006.01)
*G01N 21/57* (2006.01)
*G01J 3/50* (2006.01)

(52) U.S. Cl.
CPC ............ *G01N 21/255* (2013.01); *G01J 3/50* (2013.01); *G01N 21/251* (2013.01); *G01N 21/27* (2013.01);
(Continued)

(58) Field of Classification Search
CPC .... G01N 21/57; G01N 21/255; G01N 21/251; G01N 21/27; G01N 2201/065
See application file for complete search history.

(56) References Cited

U.S. PATENT DOCUMENTS 4,886,355 A * 12/1989 Keane .................. G01J 3/02
356/73
5,517,315 A * 5/1996 Snail .................... G01N 21/474
250/339.07
(Continued)

FOREIGN PATENT DOCUMENTS

EP 0335192 A2 10/1989
JP 11-072388 3/1999
(Continued)

OTHER PUBLICATIONS

Reflectance/Transmittance Integrating Spheres, Labsphere, May 3, 2016, http://labsphere.com/labsphere-products-solutions/components-accessories/integrating-sphere-componets-accessories/reflectance-transmittance-spheres.
(Continued)

*Primary Examiner* — Steven Whitesell Gordon
(74) *Attorney, Agent, or Firm* — Cozen O'Connor

(57) ABSTRACT

The reflection characteristic measuring device according to the present invention is a device that includes a diffuse reflecting surface and measures a plurality of mutually different types of reflection characteristics by using a plurality of optical systems having mutually different geometries, which corrects the reflection characteristics to be measured by an error generated when light emitted from an object of measurement is reflected from the diffuse reflecting surface and illuminates the object of measurement. The reflection characteristic measuring device according to the present invention is therefore capable of reducing errors resulting from recursive diffused illumination.

11 Claims, 10 Drawing Sheets

(52) U.S. Cl.
CPC ....... *G01N 21/57* (2013.01); *G01N 2201/065* (2013.01)

(56) References Cited

U.S. PATENT DOCUMENTS

| | | | |
|---|---|---|---|
| 5,859,709 A | | 1/1999 | Imura |
| 5,956,133 A | * | 9/1999 | Imura .................. G01N 21/474 250/228 |
| 7,741,629 B2 | | 6/2010 | Schwarz et al. |
| 2014/0350895 A1 | | 11/2014 | Kettler et al. |

FOREIGN PATENT DOCUMENTS

| | | |
|---|---|---|
| JP | 2006-145374 | 6/2006 |
| JP | 2007-093273 | 4/2007 |
| JP | 2007-517187 | 6/2007 |
| JP | 2012-103236 | 5/2012 |
| WO | WO 2015/178142 | 11/2015 |
| WO | WO 2017-094559 | 6/2017 |

OTHER PUBLICATIONS

International Search Report dated Aug. 15, 2017 issued in the corresponding Application No. PCT/JP2017/019395.
Written Opinion of the International Searching Authority dated Aug. 15, 2017 issued in the corresponding Application No. PCT/JP2017/019395.
Search Report dated May 22, 2019 issued in European Patent Application No. 17806494.5.

* cited by examiner

A. TOP VIEW

B. CROSS-SECTIONAL VIEW

POSITION OF OBJECT (SAMPLE)
TO BE MEASURED

INTEGRATING SPHERE LUMINANCE DURING DIFFUSED ILLUMINATION –
RECURSIVE DIFFUSED ILLUMINATION ERROR

○ GLASS, RESINS    △ METALS    ┄┄┄ FITTING FUNCTION
(POLYNOMIAL) (GLASS, RESINS)

A. TOP VIEW

B. CROSS-SECTIONAL VIEW

A. TOP VIEW

B. CROSS-SECTIONAL VIEW

A. TOP VIEW

B. CROSS-SECTIONAL VIEW

REFLECTION CHARACTERISTIC MEASURING DEVICE

RELATED APPLICATIONS

This is a U.S. National Phase Application under 35 USC 371 of International Application PCT/JP2017/019395 filed on May 24, 2017.

This application claims the priority of Japanese application no. 2016-108282 filed May 31, 2016, the entire content of which is hereby incorporated by reference.

TECHNICAL FIELD

The present invention relates to a reflection characteristic measuring device that illuminates an object of measurement, which is an object to be measured, and measures its reflection characteristic.

BACKGROUND ART

Conventionally, a reflection characteristic measuring device that measures a reflection characteristic has been known. Examples of the reflection characteristic include, for example, a spectral reflectance, a gloss value, brilliance, and the like. The spectral reflectance is a reflectance for each wavelength. The gloss value is a numerical value that represents a degree of glossiness, and is obtained according to a ratio between intensity of specular reflection light and intensity of scattered reflection light. The brilliance is a numerical value representing a glittering appearance caused by a brightening agent (such as aluminum flake) included in a metallic paint, a pearl paint, and the like. Those various reflection characteristics are defined by, for example, standards and the like, and there is geometry suitable for the measurement. For example, the spectral reflectance is measured using geometry such as 45° illumination/0° reception, 45° illumination/multi-angle reception, and diffuse illumination/8° reception. Further, for example, the gloss value is measured using geometry of 20° gloss (20° illumination/20° reception), 60° gloss (60° illumination/60° reception), and 85° gloss (85° illumination/85° reception). Therefore, conventionally, in general, the spectral reflectance has been measured by, for example, a spectroscope for spectral reflectance measurement, the gloss value has been measured by, for example, a glossmeter for gloss measurement, and the brilliance has been measured by a measuring device for brilliance measurement. In recent years, for example, as disclosed in Patent Literature 1, those plurality of measuring devices is integrated into one measuring device, and a device capable of measuring a plurality of types of reflection characteristics with respect to the same part of an object of measurement, which is an object to be measured, has been developed.

Meanwhile, for the measurement of the reflection characteristic, there is measurement using a diffuse reflecting member having a diffuse reflecting surface that performs diffuse reflection such as an integrating sphere. For example, in a case where the spectral reflectance is measured using the geometry of diffuse illumination/8° reception, an integrating sphere is used to generate the diffuse illumination. As described above, in a case where the plurality of measuring devices is integrated into one measuring device, the integrated measuring device includes a plurality of geometries to make it possible to measure a plurality of types of reflection characteristics. As a result, there may be a case where the integrated measuring device is provided with a geometry including the diffuse reflecting member (first geometry) as necessary for the measurement, and a geometry not including the diffuse reflecting member (second geometry) unnecessary for the measurement. In such a case, at the time of measuring using the second geometry, the light in the second geometry is diffusely reflected by the diffuse reflecting surface of the first geometry, and the diffusely reflected light and the light caused by the diffused light may be measured using the second geometry at times, which results in a measurement error. As an example, in a case where the geometry of diffuse illumination/8° reception and the geometry of 60° gloss (60° illumination/60° reception) are integrated, while the illumination light in the geometry of 60° gloss is reflected by a surface of the object to be measured and most of the reflected light is received and measured by a light receiving part in the geometry of 60° gloss, a part of the reflected light is made incident on the integrating sphere in the geometry of diffuse illumination/8° reception. For example, the reflected light is roughly divided into surface reflected light having been subject to Fresnel reflection on the surface and internal diffuse reflected light that once penetrates into the object to be measured, being absorbed by the object to be measured, for example, and then being emitted from the surface. The surface reflected light is scattered due to surface roughness of the object to be measured, and light having an angle larger than an acceptance angle range at the geometry of 60° gloss is made incident on the integrating sphere. Most of the internal diffuse reflected light is made incident on the integrating sphere. The light having been incident on the integrating sphere repeats irregular reflection in the integrating sphere, and a part of the light illuminates the object to be measured (recursive diffused illumination). The light based on the recursive diffused illumination acts on the object to be measured in a similar manner to the illumination light in the geometry of 60° gloss described above. As a result, a part of the light is received by the light receiving part in the geometry of 60° gloss, which results in a measurement error.

CITATION LIST

Patent Literature

Patent Literature 1: U.S. Pat. No. 7,741,629 B2

SUMMARY OF INVENTION

The present invention has been conceived in view of the circumstances described above, and an object of the present invention is to provide a reflection characteristic measuring device capable of reducing errors caused by recursive diffused illumination in a reflection characteristic measuring device having a plurality of geometries.

The reflection characteristic measuring device according to the present invention is a device that includes a diffuse reflecting surface and measures a plurality of mutually different types of reflection characteristics by using a plurality of optical systems having mutually different geometries, which corrects the reflection characteristics to be measured by an error generated by light emitted from an object of measurement being reflected by the diffuse reflecting surface and illuminating the object of measurement. Therefore, the reflection characteristic measuring device according to the present invention can reduce the error caused by the recursive diffused illumination.

DESCRIPTION OF EMBODIMENTS

Figure 1:
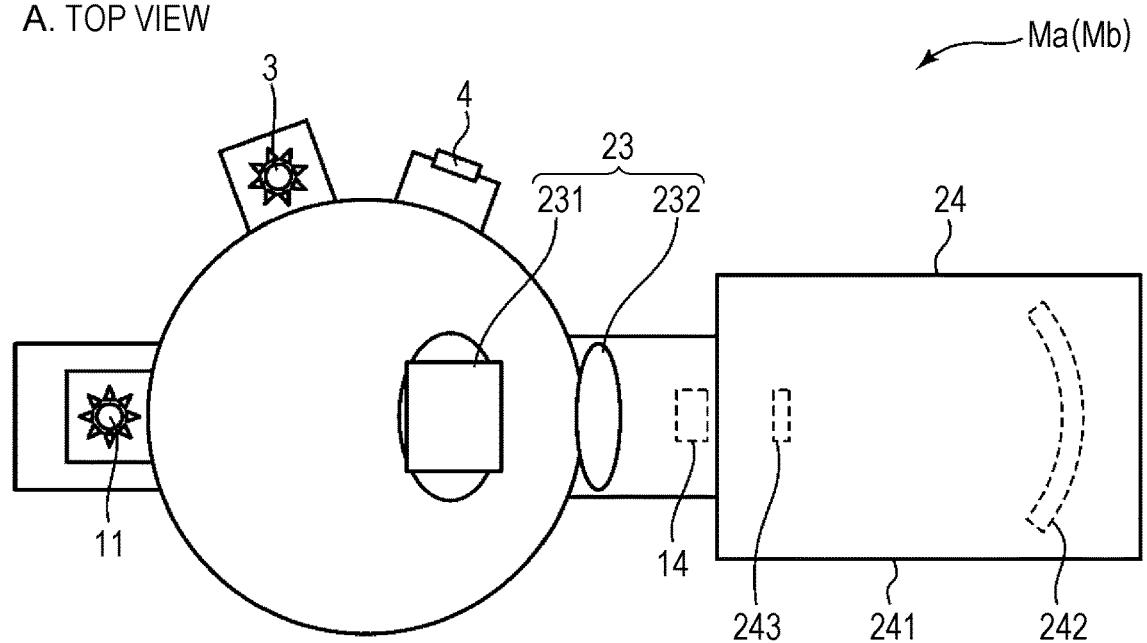
FIG. 1 is a diagram illustrating an optical configuration of a reflection characteristic measuring device according to first and second embodiments.
Figure 1:
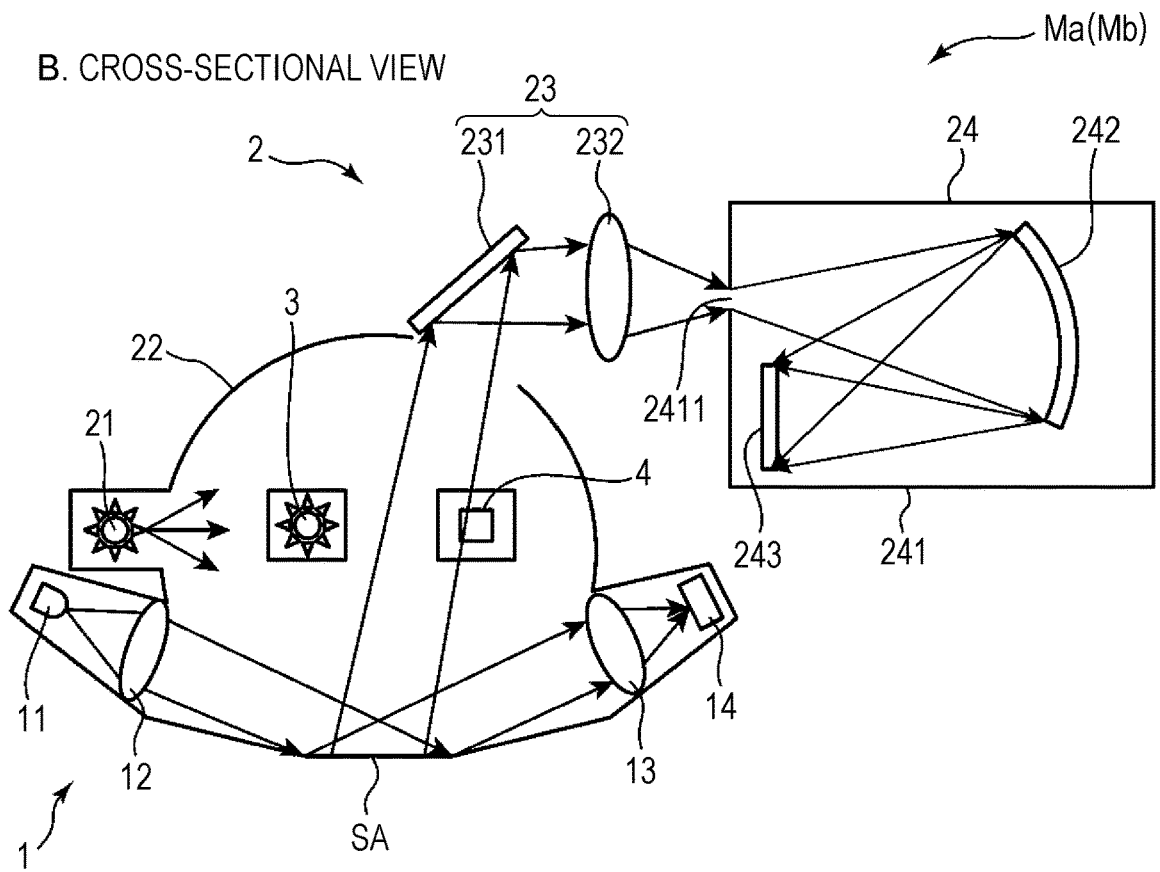

Hereinafter, embodiments of the present invention will be described with reference to the accompanying drawings. Note that configurations denoted by the same reference signs in each drawing indicate the same configurations, and descriptions thereof are omitted as appropriate. In the present description, a generic term is denoted by a reference sign with a suffix being omitted, and an individual configuration is denoted by a reference sign with a suffix.

A reflection characteristic measuring device according to an embodiment includes an optical measurer that includes a measurement aperture and measures, using a plurality of optical systems having mutually different geometries, a plurality of mutually different types of reflection characteristics by irradiating an object of measurement facing the measurement aperture with measurement light and receiving reflected light. The reflection characteristic includes at least a plurality of values from, for example, a spectral reflectance, a gloss value, and brilliance of the object of measurement that is an object to be measured. The optical measurer includes a diffuse reflecting member having a diffuse reflecting surface that performs diffuse reflection in at least one of the plurality of optical systems. The diffuse reflecting member is, for example, an integrating sphere. The integrating sphere is a hollow sphere in which a material having high diffuse reflectance covers the inside thereof. Examples of the material having high diffuse reflectance include magnesium oxide, aluminum oxide, barium sulfate, magnesium sulfate, zinc oxide, and the like. A coating agent including a material having a high diffuse reflectance is applied to the inner surface of the sphere, thereby forming the diffuse reflecting surface. The reflection characteristic measuring device further includes a corrector that corrects the reflection characteristic measured by the optical measurer using an error generated by light emitted from the object of measurement facing the measurement aperture being reflected by the diffuse reflecting surface and illuminating the object of measurement facing the measurement aperture. Since such a reflection characteristic measuring device includes the corrector, errors caused by recursive diffused illumination can be reduced in the reflection characteristic measuring device having a plurality of geometries.

Hereinafter, such a reflection characteristic measuring device will be described in more detail with reference to first to sixth embodiments. Note that, in each drawing, a configuration of a reflection characteristic measuring device M (Ma) according to a first embodiment is indicated by adding a suffix "a" to the reference sign, a configuration of a reflection characteristic measuring device M (Mb) according to a second embodiment is indicated by adding a suffix "b" to the reference sign, a configuration of a reflection characteristic measuring device M (Mc) according to a third embodiment is indicated by adding a suffix "c" to the reference sign, a configuration of a reflection characteristic measuring device M (Md) according to a fourth embodiment is indicated by adding a suffix "d" to the reference sign, a configuration of a reflection characteristic measuring device M (Me) according to a fifth embodiment is indicated by adding a suffix "e" to the reference sign, and a configuration of a reflection characteristic measuring device M (Mf) according to a sixth embodiment is indicated by adding a suffix "f" to the reference sign.

First Embodiment

Figure 2:
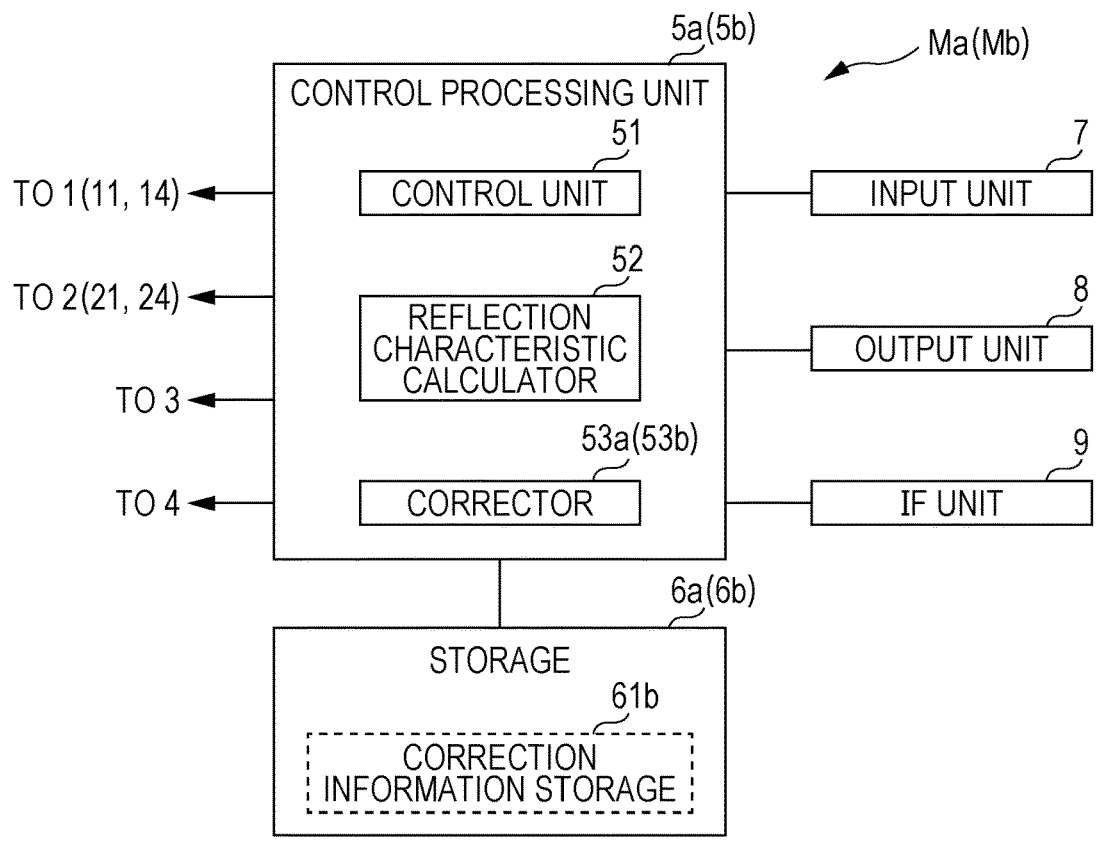
FIG. 2 is a diagram illustrating an electrical configuration of the reflection characteristic measuring device according to the first and second embodiments.

FIG. 1 is a diagram illustrating an optical configuration of a reflection characteristic measuring device according to first and second embodiments. FIG. 2 is a diagram illustrating an electrical configuration of the reflection characteristic measuring device according to the first and second embodiments.

A reflection characteristic measuring device Ma according to the first embodiment is a device that corrects a reflection characteristic using an error obtained by theoretical considerations. For example, as illustrated in FIGS. 1 and 2, optical measurers 1 and 2 provided with an integrating sphere 22 as an example of a diffuse reflecting member, a correction light source 3, a correction luminance measurer 4, and a control processing unit 5a provided with a corrector 53a are included. In the example illustrated in FIGS. 1 and 2, a storage 6a, an input unit 7, an output unit 8, and an interface unit (IF unit) 9 are further included.

The optical measurers 1 and 2 are devices that include a measurement aperture SA and measures, using a plurality of optical systems having mutually different geometries, a plurality of mutually different types of reflection characteristics by irradiating an object of measurement (not illustrated) facing the measurement aperture SA with measurement light and receiving reflected light. As described above, the reflection characteristic includes, for example, at least a plurality of values from a spectral reflectance, a gloss value, brilliance of the object of measurement that is an object to be measured, and the like, and the plurality of optical systems is configured to correspond to the plurality of types of reflection characteristics, respectively. In the present embodiment, as an example, the reflection characteristics are a gloss value measured in geometry of 60° gloss (60° illumination/60° reception) and a spectral reflectance measured in geometry of diffuse illumination/8° reception. Corresponding to the above, the optical measurers 1 and 2 according to the present embodiment include a gloss measurer 1 that measures a gloss value using the geometry of 60° gloss (60° illumination/60° reception), and a spectroscopic measurer 2 that measures the spectral reflectance using the geometry of diffuse illumination/8° reception.

The gloss measurer 1 includes a first light source 11, a first optical system that includes a first illumination optical system 12 and a first light receiving optical system 13 and forms the geometry of 60° gloss, a first measurer 14, and a reflection characteristic calculator 52 in the control processing unit 5a to be described later. The first light source 11 is a device that is connected to the control processing unit 5a and emits predetermined first illumination light under the control of the control processing unit 5a, which is configured to include, for example, a white LED. The first illumination optical system 12 is an optical system in which the first illumination light emitted from the first light source 11 is made incident and the first illumination light is collimated so that the object of measurement facing the measurement aperture SA is illuminated with the first illumination light from a single direction, which is configured to include, for example, one or a plurality of optical elements such as a lens. The first light receiving optical system 13 is an optical system that receives a first reflected light of the first illumination light reflected from the object of measurement from a single direction and concentrates and guide the first reflected light to the first measurer 14, which is configured to include, for example, one or a plurality of optical elements such as a lens. The first measurer 14 is a device that is connected to the control processing unit 5a and measures the first reflected light of the first illumination light emitted from the first light receiving optical system 13 under the control of the control processing unit 5a, which is configured to include, for example, a silicon photodiode for measuring intensity of the reflected light. The first measurer 14 outputs the measurement output to the control processing unit 5a.

The spectroscopic measurer 2 includes a second light source 21, a second optical system that includes a second illumination optical system 22 and a second light receiving optical system 23 and forms the geometry of diffuse illumination/8°, a second measurer 24, and the reflection characteristic calculator 52. The second light source 21 is a device that is connected to the control processing unit 5a and emits predetermined second illumination light for illuminating a diffuse reflecting surface of the second illumination optical system 22 under the control of the control processing unit 5a, which is configured to include, for example, a white LED. The second illumination optical system 22 is an optical system in which the second illumination light emitted from the second light source 21 is made incident and the object of measurement facing the measurement aperture SA is illuminated with diffused light of the second illumination light diffusely reflected by the diffuse reflecting surface, which is, for example, the integrating sphere 22 as an example of the diffuse reflecting member. The second light source 21 is disposed in a first recess formed at a predetermined position on the inner surface of the integrating sphere 22, and illuminates the diffuse reflecting surface covering the entire inner surface of the integrating sphere 22 with the second illumination light. The second light receiving optical system 23 is an optical system that receives a second reflected light of the diffused light reflected from the object of measurement and concentrates and guide the second reflected light to the second measurer 24, which is configured to include, for example, one or a plurality of optical elements such as a lens. More specifically, a mirror 231, and one or a plurality of lenses 232 are included. The mirror 231 is provided on an opening formed on the integrating sphere 22 at a position corresponding to the 8° direction of the measurement aperture SA, and reflects the second reflected light of the diffused light emitted from the opening. The lenses 232 guide the second reflected light of the diffused light reflected by the mirror 231 to the second measurer 24. The second measurer 24 is a device that is connected to the control processing unit 5a and spectroscopically measures, under the control of the control processing unit 5a, the second reflected light of the diffused light emitted from the second light receiving optical system 23, which is configured to include, for example, a spectrometer. More specifically, the second measurer 24 includes a box-shaped casing 241 having a slit-like opening into which the second reflected light of the diffused light is made incident, a reflection type concave surface diffraction grating 242 that diffracts and reflects the second reflected light of the diffused light entered from the opening, and a line sensor 243 that has a plurality of line-shaped parallel photodiodes and receives the second reflected light diffracted and reflected by the reflection type concave surface diffraction grating 242. The second measurer 24 outputs the measurement output to the control processing unit 5a.

The measurement aperture SA is shared by the gloss measurer 1 and the spectroscopic measurer 2, and only one measurement aperture SA is formed in the integrating sphere 22.

The correction light source 3 is a device that is connected to the control processing unit 5a and emits predetermined correction illumination light for illuminating the diffuse reflecting surface of the integrating sphere 22 under the control of the control processing unit 5a, which is configured to include, for example, a white LED. The correction light source 3 is disposed in a second recess formed at a predetermined position different from the first recess on the inner surface of the integrating sphere 22, and illuminates the diffuse reflecting surface covering the entire inner surface of the integrating sphere 22 with the correction illumination light. Note that the correction light source 3 may also serve as the second light source 21.

The correction luminance measurer 4 is a device that is connected to the control processing unit 5a and measures, under the control of the control processing unit 5a, luminance of the diffuse reflecting surface of the integrating sphere 22 illuminated with the correction illumination light of the correction light source 3 and luminance of the diffuse reflecting surface of the integrating sphere 22 illuminated with light reflected by the object of measurement illuminated with the first illumination light emitted from the first light source 11, which is configured to include, for example, a silicon photodiode for measuring intensity of the diffuse reflected light diffusely reflected by the diffuse reflecting surface. The correction luminance measurer 4 outputs the measurement output to the control processing unit 5a. The correction luminance measurer 4 is disposed in a third recess formed at a predetermined position different from the first and second recesses on the inner surface of the integrating sphere 22, and receives and measures the diffuse reflected light diffusely reflected by the diffuse reflecting surface covering the entire inner surface of the integrating sphere 22. A baffle may be provided between the correction light source 3 and the correction luminance measurer 4 so that the correction illumination light emitted from the correction light source 3 does not directly reach the correction luminance measurer 4. Further, in a case where the spectroscopic measurer 2 includes a sensor for monitoring the inner surface luminance of the integrating sphere 22 to measure the spectral reflectance, the correction luminance measurer 4 may also serve as this sensor.

In order to obtain an error more accurately, the spectral sensitivity of the correction luminance measurer 4 is preferably the same as the spectral sensitivity of the first measurer 14. In this case, for example, an optical filter that compensates (corrects) for a difference between the spectral sensitivity of the correction luminance measurer 4 and the spectral sensitivity of the first measurer 14 is disposed on the light receiving side of the correction luminance measurer 4.

The input unit 7 is a device that is connected to the control processing unit 5a and inputs various commands such as a command for providing an instruction on measurement of the object of measurement that is the object to be measured and various data necessary for measuring, for example, an input of an identifier of the object of measurement into the reflection characteristic measuring device Ma, which is, for example, a plurality of input switches to which predetermined functions are allocated. The output unit 8 is a device that is connected to the control processing unit 5a and outputs, under the control of the control processing unit 5a, the command and data input from the input unit 7 and the reflection characteristic of the object of measurement measured by the reflection characteristic measuring device Ma, which is, for example, a display device such as a CRT display, a liquid crystal display (LCD), and an organic EL display, and a printing device such as a printer.

Note that the input unit 7 and the output unit 8 may constitute a touch panel. In a case where the touch panel is constituted, the input unit 7 is a position input device that detects and inputs an operation position such as a resistive film type and an electrostatic capacitance type, and the output unit 8 is a display device. In this touch panel, a position input device is provided on the display surface of the display device, and one or a plurality of input content candidates that can be input to the display device is displayed. When a user touches a display position displaying the input content to be input, the position is detected by the position input device, and the display content displayed at the detected position is input to the reflection characteristic measuring device Ma as input content of the user operation. With such a touch panel, since the user can easily understand the input operation intuitively, the reflection characteristic measuring device Ma easily operated by the user is provided.

The IF unit 9 is a circuit that is connected to the control processing unit 5a and inputs/outputs data to/from an external device under the control of the control processing unit 5a, which is, for example, a serial communication RS-232C interface circuit, an interface circuit using the Bluetooth (registered trademark) standard, an interface circuit performing infrared communication using, for example, the infrared data association (IrDA) standard, and an interface circuit using the universal serial bus (USB) standard.

The storage 6a is a circuit that is connected to the control processing unit 5a and stores various predetermined programs and various predetermined data under the control of the control processing unit 5a. Examples of the various predetermined programs include a control program for controlling each part of the reflection characteristic measuring device Ma, a reflection characteristic calculation program for obtaining a predetermined reflection characteristic, and a control processing program such as a correction program for correcting the reflection characteristic. The various predetermined data include data necessary for executing each program such as an identifier of the object of measurement and a measurement output from each part. The storage 6a as described above includes, for example, a read-only memory (ROM) that is a nonvolatile storage element, an electrically erasable programmable read-only memory (EEPROM) that is a rewritable nonvolatile storage element, and the like. Further, the storage 6a includes a random access memory (RAM) or the like serving as what is called a working memory of the control processing unit 5a, which stores data and the like generated during execution of the predetermined program.

The control processing unit 5a is a circuit for controlling each part of the reflection characteristic measuring device Ma according to a function of each part and obtaining the reflection characteristic of the object of measurement. The control processing unit 5a includes, for example, a central processing unit (CPU), and peripheral circuits thereof. The control processing unit 5a functionally includes a control unit 51, the reflection characteristic calculator 52, and the corrector 53a by the control processing program being executed.

The control unit 51 controls each part of the reflection characteristic measuring device Ma according to the function of each part, and manages overall control of the reflection characteristic measuring device Ma.

The reflection characteristic calculator 52 obtains a predetermined reflection characteristic on the basis of the measurement output of the optical measurers 1 and 2. More specifically, in the present embodiment, since the reflection characteristic is the gloss value measured in the geometry of 60° gloss (60° illumination/60° reception) and the spectral reflectance measured in the geometry of diffuse illumination/8° reception as described above, the reflection characteristic calculator 52 obtains the gloss value as one of the reflection characteristic using a known calculation method on the basis of the measurement output (first measurement output) of the first measurer 14, which is corrected as described later, and obtains the spectral reflectance as another one of the reflection characteristic using a known calculation method on the basis of the measurement output (second measurement output) of the second measurer 24. In this manner, the reflection characteristic calculator 52 according to the present embodiment functions as a gloss calculation unit for obtaining the gloss value and a spectroscopic calculation unit for obtaining the spectral reflectance.

The corrector 53a corrects the reflection characteristic measured by the optical measurers 1 and 2 using an error E caused by light emitted from the object of measurement facing the measurement aperture SA being reflected by the diffuse reflecting surface of the integrating sphere 22 and illuminating the object of measurement facing the measurement aperture SA, and obtains the reflection characteristic of a true value or a value closer to the true value. In the present embodiment, the corrector 53a performs correction using the error E obtained by theoretical considerations. More specifically, the corrector 53a obtains the error E on the basis of a measurement output (A1 measurement output) Bc of the correction luminance measurer 4 of a case where only the correction light source 3 emits the correction illumination light, a measurement output (A2 measurement output) B of the correction luminance measurer 4 of a case where only the first light source 11 emits the first illumination light, and a measurement output (A3 measurement output) Gd of the first measurer 14 of a case where only the correction light source 3 emits the correction illumination light, corrects a first measurement output Ge of the first measurer 14 of a case where only the first light source 11 emits the first illumination light using the obtained error E, and obtains a first measurement output G of a true value or a value closer to the true value.

More specifically, emission spectrum distribution of the first light source 11 (spectrum distribution of the first illumination light) is Sg, and emission spectrum distribution of the correction light source 3 (spectrum distribution of the correction illumination light) is Sc. In a case where the diffuse reflected light from the integrating sphere 22 illuminates the object of measurement, reflection spectrum distribution in the reflected light of the diffuse reflected light directed toward the first light receiving optical system 13 is Rdg. In a case where the first illumination light from the first light source 11 illuminates the object of measurement, reflection spectrum distribution in the reflected light of the first illumination light directed toward the integrating sphere 22 is R60s. In a case where the first illumination light from the first light source 11 illuminates the object of measurement, the reflection spectrum distribution in the reflected light of the first illumination light directed toward the first light receiving optical system 13 is R60g. The spectral sensitivity of the first measurer 14 is Fg, and the spectral sensitivity of the correction luminance measurer 4 is Fc. In a case where an integrating sphere efficiency including influence of the reflection characteristic of the object of measurement is M, the first measurement output Ge of the first measurer 14 of a case where only the first light source 11 emits the first illumination light is expressed by Formula 1. The A3 measurement output Gd of the first measurer 14 of a case where only the correction light source 3 emits the correction illumination light is expressed by Formula 2. The A2 measurement output B of the correction luminance measurer 4 of a case where only the first light source 11 emits the first illumination light is expressed by Formula 3. Further, the A1 measurement output Bc of the correction luminance measurer 4 of a case where only the correction light source 3 emits the correction illumination light is expressed by Formula 4.

[Formula 1]

$$G_e = \int_{\lambda_1}^{\lambda_2} S_g(\lambda) R_{60g}(\lambda) F_g(\lambda) d\lambda + \int_{\lambda_1}^{\lambda_2} M(\lambda) S_g(\lambda) R_{60s}(\lambda) R_{dg}(\lambda) F_g(\lambda) d\lambda \quad (1)$$

[Formula 2]

$$G_d = \int_{\lambda_1}^{\lambda_2} M(\lambda) S_c(\lambda) R_{dg}(\lambda) F_g(\lambda) d\lambda \quad (2)$$

[Formula 3]

$$B = \int_{\lambda_1}^{\lambda_2} M(\lambda) S_g(\lambda) R_{60s}(\lambda) F_c(\lambda) d\lambda \quad (3)$$

[Formula 4]

$$B_c = \int_{\lambda_1}^{\lambda_2} M(\lambda) S_c(\lambda) F_c(\lambda) d\lambda \quad (4)$$

The first term on the right side of Formula 1 is a true value of the first measurement output G, and the second term on the right side of Formula 1 is the error E due to the recursive diffused illumination. From Formulae 2, 3, and 4, the error E can be estimated by Formula 5, and thus the first measurement output G of the true value or a value closer to the true value can be obtained by Formula 6.

[Formula 5]

$$E = G_d \times \frac{B}{B_c} \approx \int_{\lambda_1}^{\lambda_2} M(\lambda) S_g(\lambda) R_{60s}(\lambda) R_{dg}(\lambda) F_g(\lambda) d\lambda \quad (5)$$

[Formula 6]

$$G = G_e - E \quad (6)$$

As described above, the corrector 53a according to the first embodiment obtains the error E and obtains the first measurement output G of the true value or a value closer to the true value.

The control processing unit 5a then obtains, using the reflection characteristic calculator 52, a gloss value Sh that is one of the reflection characteristic on the basis of the obtained first measurement output G of the true value or a value closer to the true value, and outputs the obtained gloss value Sh that is one of the reflection characteristic to the output unit 8 using the control unit 51. Alternatively, as necessary, the control unit 51 outputs the obtained gloss value Sh that is one of the reflection characteristic from the IF unit 9 to an external device (such as USB memory).

Figure 3:
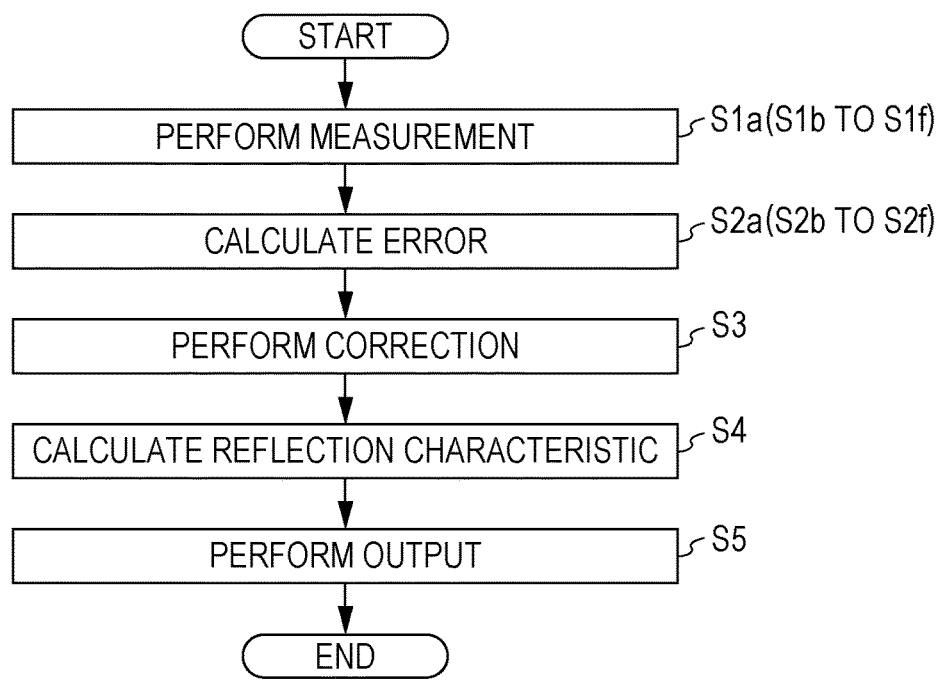
FIG. 3 is a flowchart illustrating operation of the reflection characteristic measuring device according to first to sixth embodiments.
Figure 4:
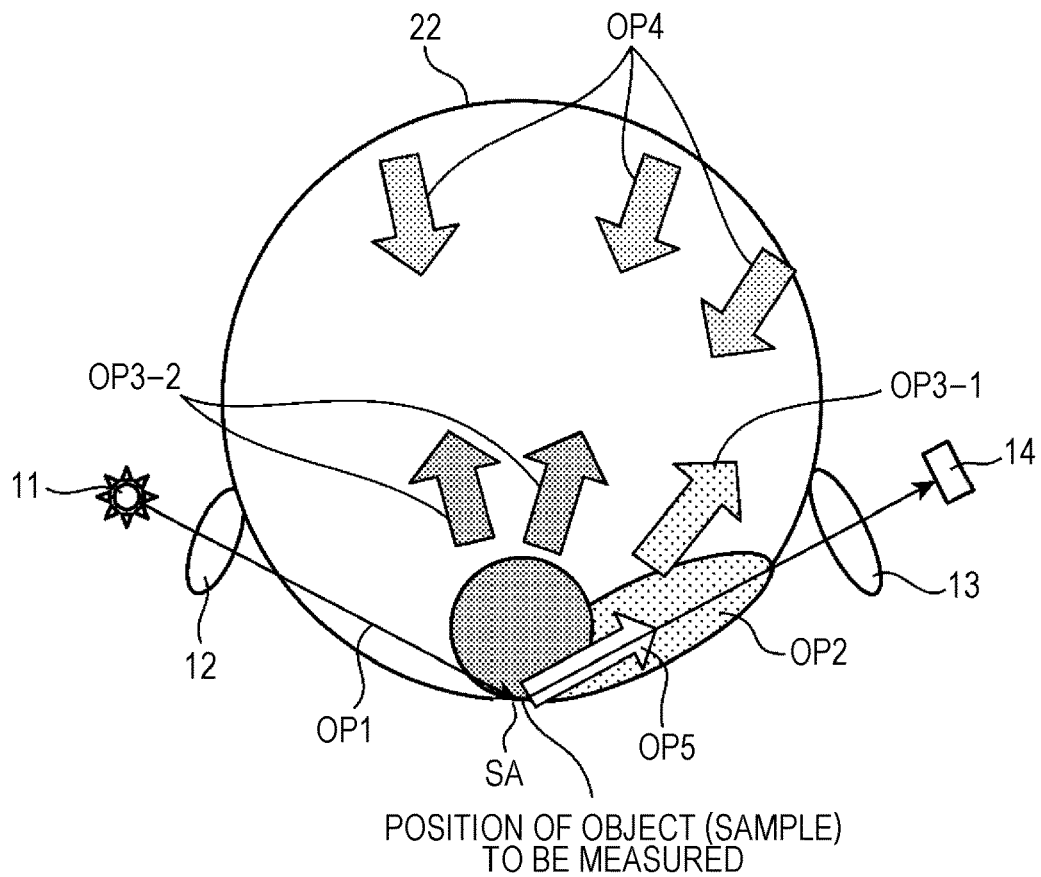
FIG. 4 is a diagram for explaining recursive diffused illumination.

Next, operation of the reflection characteristic measuring device Ma according to the first embodiment will be described. FIG. 3 is a flowchart illustrating the operation of the reflection characteristic measuring device according to first to sixth embodiments. FIG. 4 is a diagram for explaining the recursive diffused illumination.

First, when a power switch (not illustrated) is turned on, the reflection characteristic measuring device Ma is activated, necessary parts are initialized by the control processing unit 5a, and the control processing program is executed so that the control unit 51, the reflection characteristic calculator 52, and the corrector 53a are functionally configured in the control processing unit 5a.

When the user (operator) inputs an instruction on measurement of the gloss value from the input unit 7, measurement is performed by each unit in FIG. 3 (S1a). More specifically, in the reflection characteristic measuring device Ma, only the correction light source 3 is turned on by the control unit 51, and the A1 measurement output Bc of the correction luminance measurer 4 and the A3 measurement output Gd of the first measurer 14 in this case are obtained and stored in the storage 6a. Next, in the reflection characteristic measuring device Ma, only the first light source 11 is turned on by the control unit 51, and the A2 measurement output B of the correction luminance measurer 4 and the first measurement output Ge of the first measurer 14 in this case are obtained and stored in the storage 6a.

The reflection characteristic measuring device Ma then obtains the error E using the corrector 53a of the control processing unit 5a (S2a). More specifically, the corrector 53a obtains the error E from the A1 measurement output Bc, the A2 measurement output B, and the A3 measurement output Gd stored in the storage 6a using Formula 5 mentioned above, and stores it in the storage 6a (E=Gd×(B/Bc)).

Next, in the reflection characteristic measuring device Ma, the first measurement output Ge before correction stored in the storage 6a is corrected by the corrector 53a using the error E obtained in the processing S2a, and the first measurement output G after correction is obtained (S3). More specifically, the corrector 53a obtains the first measurement output G after correction by Formula 6 mentioned above using the first measurement output Ge before correction and the error E stored in the storage 6a (i.e., subtracting the error E from the first measurement output Ge before correction) (G=Ge−E).

Next, the reflection characteristic measuring device Ma obtains the gloss value Sh that is one of the reflection characteristic using the reflection characteristic calculator 52 of the control processing unit 5a (S4). More specifically, the reflection characteristic calculator 52 obtains the gloss value Sh using a known calculation method on the basis of the first measurement output G after correction, and stores it in the storage 6a.

Then, in the reflection characteristic measuring device Ma, the obtained gloss value Sh that is one of the reflection characteristic is output to the output unit 8 by the control unit 51 of the control processing unit 5a (S5), and the process is terminated. Note that the control unit 51 may output the obtained gloss value Sh that is one of the reflection characteristic from the IF unit 9 to an external device (such as USB memory) as necessary.

When the user (operator) inputs an instruction on measurement of the spectral reflectance from the input unit 7, in a similar manner to a known spectrometer, the reflection characteristic measuring device Ma performs measurement using the spectroscopic measurer 2, obtains the spectral reflectance as one of the reflection characteristic using the reflection characteristic calculator 52 and a known calculation method on the basis of the second measurement output of the second measurer 24, and outputs the obtained spectral reflectance to the output unit 8.

As described above, since the reflection characteristic measuring device Ma according to the first embodiment includes the corrector 53a, even in the case of a device having a plurality of geometries including the diffuse reflecting member (integrating sphere in this case) 22, the error caused by the recursive diffused illumination can be reduced. That is, as illustrated in FIG. 4, in the case of measuring the gloss value of the object of measurement, when the first light source 11 of the gloss measurer 1 illuminates the object of measurement facing the measurement aperture SA with first illumination light OP1, the first illumination light OP1 is reflected by the surface of the object of measurement, and most of the reflected light OP2 is received by the first measurer 14 via the first light receiving optical system 13 of the gloss measurer 1 and is measured, whereas a part of the reflected light OP3 (OP3-1 and OP3-2) is made incident on the integrating sphere 22 of the spectroscopic measurer 2. For example, the reflected light is roughly divided into surface reflected light having been subject to Fresnel reflection on the surface and internal diffuse reflected light that once penetrates into the object to be measured, being absorbed by the object to be measured, for example, and then being emitted from the surface. The surface reflected light is scattered due to surface roughness of the object to be measured, and the light OP3-1 having an angle larger than an acceptance angle range of the first light receiving optical system 13 in the gloss measurer 1 is made incident on the integrating sphere 22. The major part OP3-2 of the internal diffuse reflected light is made incident on the integrating sphere 22. The light OP3 having been incident on the integrating sphere 22 repeats irregular reflection in the integrating sphere, and a part of the light OP4 illuminates the object of measurement (recursive diffused illumination). In a similar manner to the first illumination light OP1 described above, the light OP4 based on the recursive diffused illumination acts on the object of measurement. As a result, a part of the light OP5 is received by the first measurer 14 via the first light receiving optical system 13 of the gloss measurer 1 to generate the error E. The error E varies depending on the surface reflectance, the surface roughness, the internal diffuse reflectance, the integrating sphere efficiency, and the like of the object of measurement. Although the integrating sphere efficiency is a known value to some extent as it is determined by a design of the integrating sphere 22, each of the other values requires dedicated measurement, and such measurement is complex. However, in the reflection characteristic measuring device Ma according to the first embodiment, the error E due to the recursive diffused illumination is obtained by the corrector 53a and correction is made on the basis of the error E as described above, whereby the error E due to the recursive diffused illumination can be reduced.

Further, the reflection characteristic measuring device Ma according to the first embodiment performs correction on the basis of the theoretical considerations, and is capable of reducing the error E caused by the recursive diffused illumination.

Next, another embodiment will be described.

Second Embodiment

Figure 5:
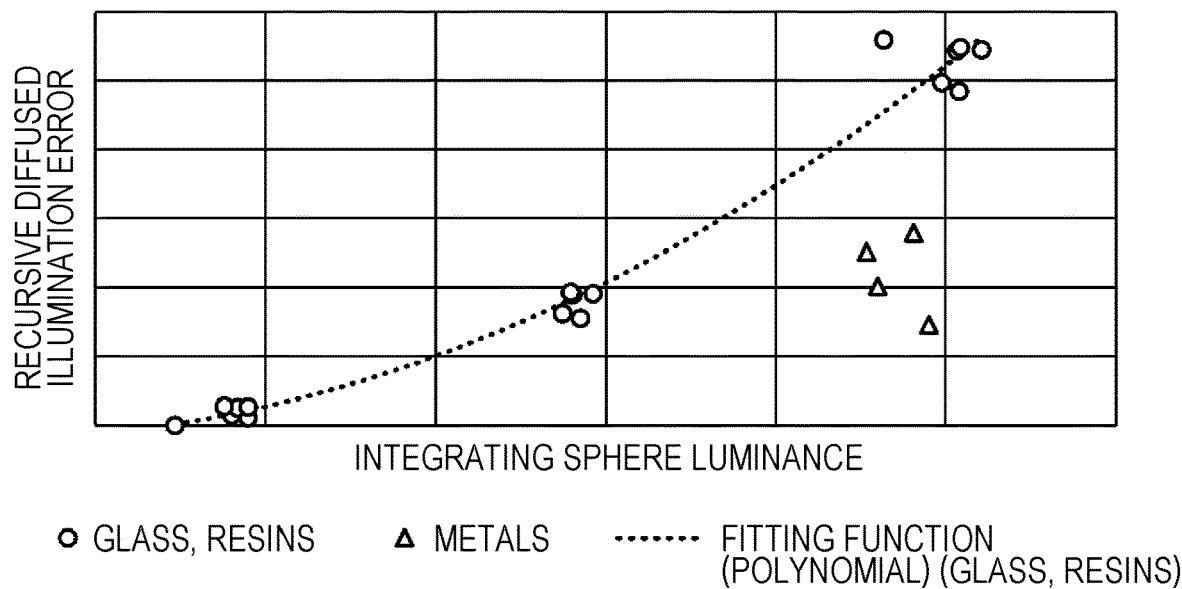
FIG. 5 is a chart for explaining a correspondence relationship for obtaining an error stored in the reflection characteristic measuring device according to the second embodiment.

FIG. 5 is a chart for explaining a correspondence relationship for obtaining an error stored in a reflection characteristic measuring device according to a second embodiment.

While the reflection characteristic measuring device Ma according to the first embodiment performs correction on the basis of theoretical considerations, a reflection characteristic measuring device Mb according to the second embodiment performs correction by obtaining an error E from a predetermined correspondence relationship obtained in advance. In a similar manner to the reflection characteristic measuring device Mb according to the second embodiment, reflection characteristic measuring devices Mc to Mf according to third to sixth embodiments to be described later also perform correction by obtaining the error E from a predetermined correspondence relationship obtained in advance although the predetermined correspondence relationship is different.

Such a reflection characteristic measuring device Mb according to the second embodiment includes, for example, as illustrated in FIGS. 1 and 2, optical measurers 1 and 2, a correction light source 3, a correction luminance measurer 4, a control processing unit 5b provided with a corrector 53b, and a storage 6b. In the example illustrated in FIGS. 1 and 2, an input unit 7, an output unit 8, and an IF unit 9 are further included. The optical measurers 1 and 2, the correction light source 3, the correction luminance measurer 4, the input unit 7, the output unit 8, and the IF unit 9 in the reflection characteristic measuring device Mb according to the second embodiment are similar to the optical measurers 1 and 2, the correction light source 3, the correction luminance measurer 4, the input unit 7, the output unit 8, and the IF unit 9 in the reflection characteristic measuring device Ma according to the first embodiment, respectively, and descriptions thereof are omitted.

The storage 6b functions in a similar manner to the storage 6a in the reflection characteristic measuring device Ma according to the first embodiment, and a correction information storage 61b that stores a predetermined first correspondence relationship, which is indicated by the short-dashed line in FIG. 2, is further included in the second embodiment.

The predetermined first correspondence relationship is a correspondence relationship between a measurement output of the correction luminance measurer (B measurement output) and the error E. More specifically, in the second embodiment, the predetermined first correspondence relationship is a B1 correspondence relationship between a measurement output of the correction luminance measurer 4 (B1 measurement output) of a case where only the correction light source 3 emits correction illumination light and the error E. Such a B1 correspondence relationship is obtained in advance by, for example, actual measurement using a plurality of samples, or simulation using, for example, an optical simulator. The first correspondence relationship obtained as described above is stored in the correction information storage 61b by a function formula thereof or in a lookup table.

In this case, the B1 correspondence relationship is obtained in advance by simulation using the optical simulator, and is stored in the correction information storage 61b by the function formula thereof. Examples of the optical simulator include LightTools manufactured by Synopsys, Inc. In this simulation, simulation was carried out under a plurality of conditions in which glass or resin (plastic) was assumed as an object of measurement, surface reflectance was set to about 10%, and surface scattering and internal diffuse reflectance were varied. A plurality of simulation results of the B1 measurement output and the error E is indicated by the dot in FIG. 5. A fitting function that fits the plurality of simulation results (the plurality of dots) of the B1 measurement output and the error E obtained in this manner is obtained as the B1 correspondence relationship using, for example, the least squares method, and the obtained fitting function is stored in the correction information storage 61b as a function formula expressing the B1 correspondence relationship.

In a case where a plurality of samples is actually measured, the plurality of samples is measured by a glossmeter alone, measured by the reflection characteristic measuring device Mb according to the second embodiment, and the error E is obtained by a difference between a measurement result of the glossmeter alone and a measurement result before correction of the reflection characteristic measuring device Mb according to the second embodiment, thereby obtaining the B1 correspondence relationship.

In addition, in FIG. 5, simulation results of the case where metals were assumed as an object of measurement are also indicated by a plurality of triangles. In this case, simulation was carried out under a plurality of conditions in which the surface reflectance was set to 90% (corresponding to aluminum), and the surface scattering was varied. It is understood that, from this result, the B1 correspondence relationship differs depending on the type of the object of measurement (difference in the surface reflectance). Therefore, the reflection characteristic measuring device Mb may be configured such that a plurality of B1 correspondence relationships corresponding to each of a plurality of types of (a plurality of surface reflectance of) the object of measurement is obtained in advance, the plurality of B1 correspondence relationships is stored in the correction information storage 61b in association with each of the plurality of types of (the plurality of surface reflectance of) the object of measurement, and a suitable B1 correspondence relationship is selected from the plurality of B1 correspondence relationships by a user or automatically by measuring the surface reflectance of the object of measurement at the time of measurement.

The control processing unit 5b is a circuit for controlling each part of the reflection characteristic measuring device Mb according to a function of each part and obtaining the reflection characteristic of the object of measurement. The control processing unit 5b includes, for example, a CPU and peripheral circuits thereof. The control processing unit 5b functionally includes a control unit 51, a reflection characteristic calculator 52, and the corrector 53b by the control processing program being executed. The control unit 51 and the reflection characteristic calculator 52 according to the second embodiment are similar to the control unit 51 and the reflection characteristic calculator 52 according to the first embodiment, respectively, and descriptions thereof are omitted.

The corrector 53b corrects the reflection characteristic measured by the optical measurers 1 and 2 using the error E caused by light emitted from the object of measurement facing the measurement aperture SA being reflected by the diffuse reflecting surface of the integrating sphere 22 and illuminating the object of measurement facing the measurement aperture SA, and obtains the reflection characteristic of a true value or a value closer to the true value. In the present embodiment, the corrector 53b obtains, from the B1 correspondence relationship, the error E corresponding to the B measurement output of the correction luminance measurer 4 at the time of measuring the object of measurement facing the measurement aperture SA, performs correction using the obtained error E, and obtains a reflection characteristic Sh (gloss value in the present embodiment) of the true value or a value closer to the true value.

Next, operation of the reflection characteristic measuring device Mb according to the second embodiment will be described. First, when a power switch (not illustrated) is turned on, the reflection characteristic measuring device Mb is activated, necessary parts are initialized by the control processing unit 5b, and the control processing program is executed so that the control unit 51, the reflection characteristic calculator 52, and the corrector 53b are functionally configured in the control processing unit 5b.

When the user (operator) inputs an instruction on measurement of the gloss value from the input unit 7, measurement is performed by each unit in FIG. 3 (S1b). More specifically, in the reflection characteristic measuring device Mb, only the correction light source 3 is turned on by the control unit 51, and the B1 measurement output of the correction luminance measurer 4 in this case is obtained and stored in the storage 6b. Then, in the reflection characteristic measuring device Mb, only a first light source 11 is turned on by the control unit 51, and a first measurement output of a first measurer 14 in this case is obtained and stored in the storage 6b.

The reflection characteristic measuring device Mb then obtains the error E using the corrector 53b of the control processing unit 5b (S2b). More specifically, the corrector 53b obtains the error E corresponding to the B1 measurement output stored in the storage 6b from the B1 correspondence relationship stored in the correction information storage 61b, and stores it in the storage 6b.

Next, in the reflection characteristic measuring device Mb, in a similar manner to the first embodiment, a first measurement output Ge before correction stored in the storage 6b is corrected by the corrector 53b using the error E obtained in the processing S2b, and a first measurement output G after correction is obtained (G=Ge−E, S3).

Next, in the reflection characteristic measuring device Mb, in a similar manner to the first embodiment, the gloss value Sh that is one of the reflection characteristic is obtained by the reflection characteristic calculator 52 of the control processing unit 5b on the basis of the first measurement output G after correction using a known calculation method, and the obtained gloss value Sh is stored in the storage 6b (S4).

Then, in the reflection characteristic measuring device Mb, the obtained gloss value Sh that is one of the reflection characteristic is output to the output unit 8 by the control unit 51 (S5), and the process is terminated.

As described above, since the reflection characteristic measuring device Mb according to the second embodiment includes the corrector 53b, even in the case of a device having a plurality of geometries including the diffuse reflecting member (integrating sphere in this case) 22, the error caused by the recursive diffused illumination can be reduced.

Further, with the reflection characteristic measuring device Mb according to the second embodiment, correction is performed using the predetermined B1 correspondence relationship such as a relational expression and a lookup table obtained in advance as described above, whereby the error E caused by the recursive diffused illumination can be reduced.

Next, another embodiment will be described.

Third Embodiment

Figure 6:
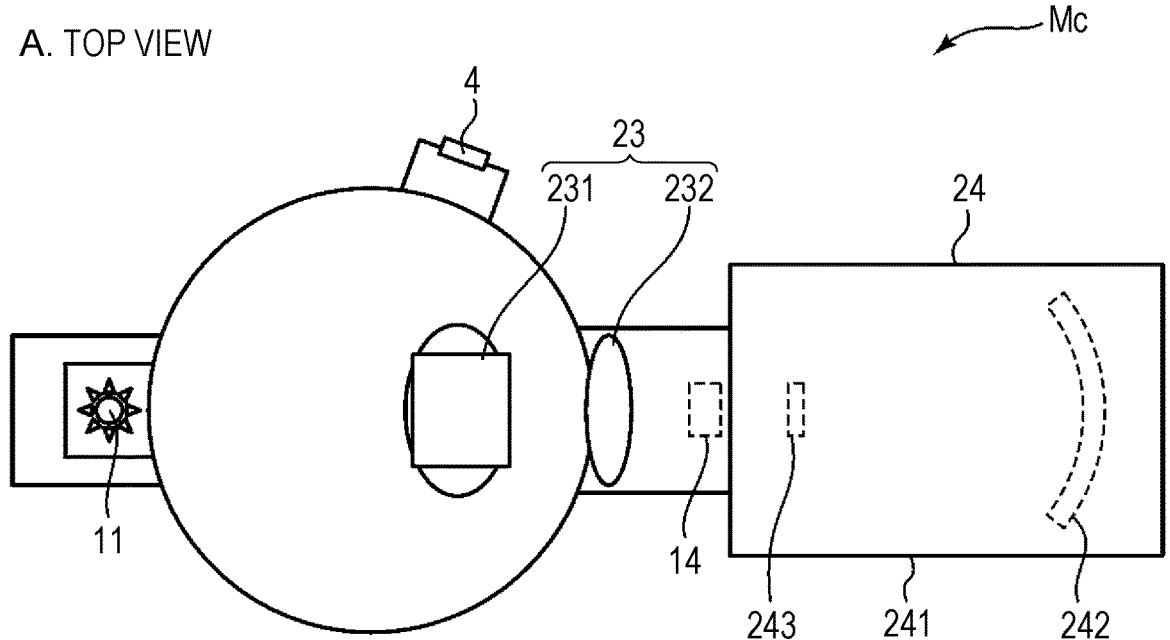
FIG. 6 is a diagram illustrating an optical configuration of the reflection characteristic measuring device according to the third embodiment.
Figure 6:
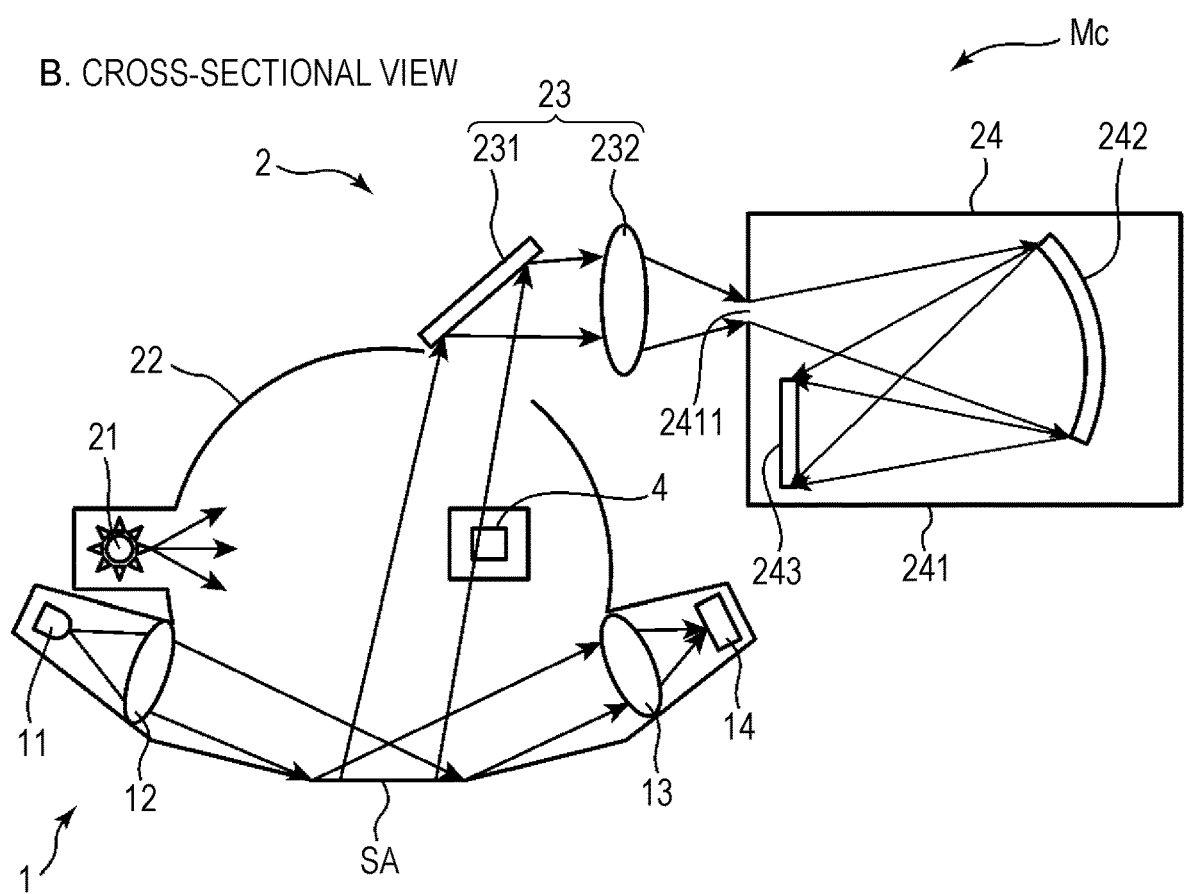
Figure 7:
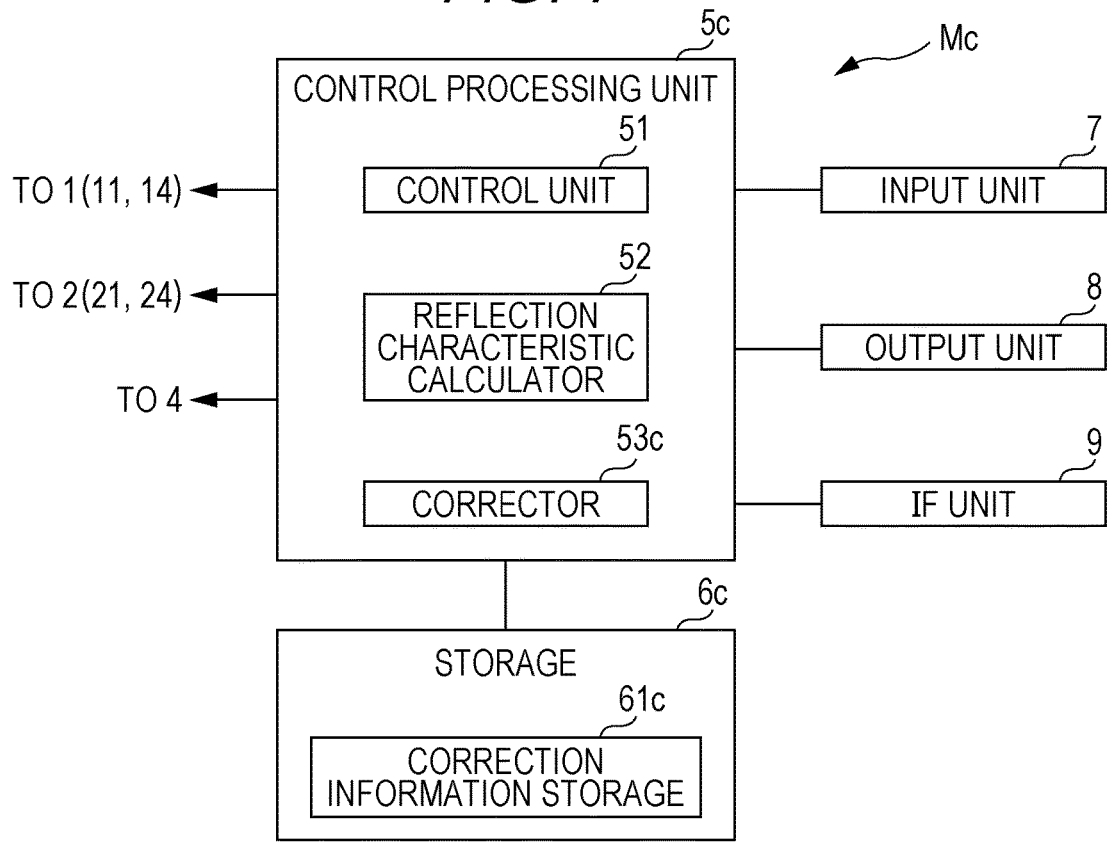
FIG. 7 is a diagram illustrating an electrical configuration of the reflection characteristic measuring device according to the third embodiment.
Figure 8:
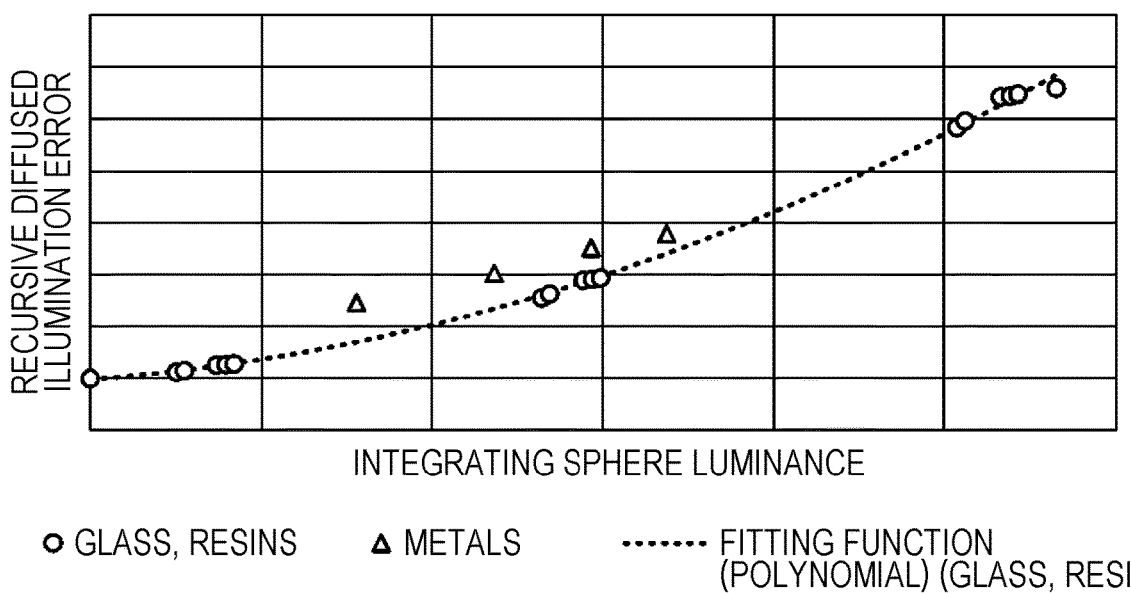
FIG. 8 is a chart for explaining a correspondence relationship for obtaining an error stored in the reflection characteristic measuring device according to the third embodiment.

FIG. 6 is a diagram illustrating an optical configuration of a reflection characteristic measuring device according to a third embodiment. FIG. 7 is a diagram illustrating an electrical configuration of the reflection characteristic measuring device according to the third embodiment. FIG. 8 is a chart for explaining a correspondence relationship for obtaining an error stored in the reflection characteristic measuring device according to the third embodiment.

A reflection characteristic measuring device Mc according to the third embodiment includes, for example, as illustrated in FIGS. 6 and 7, optical measurers 1 and 2, a correction luminance measurer 4, a control processing unit 5c provided with a corrector 53c, and a storage 6c. In the example illustrated in FIGS. 6 and 7, an input unit 7, an output unit 8, and an IF unit 9 are further included. In other words, the reflection characteristic measuring device Mc according to the third embodiment does not include a correction light source 3. The optical measurers 1 and 2, the correction luminance measurer 4, the input unit 7, the output unit 8, and the IF unit 9 in the reflection characteristic measuring device Mc according to the third embodiment are similar to the optical measurers 1 and 2, the correction luminance measurer 4, the input unit 7, the output unit 8, and the IF unit 9 in the reflection characteristic measuring device Ma according to the first embodiment, respectively, and descriptions thereof are omitted.

The storage 6c functions in a similar manner to the storage 6a in the reflection characteristic measuring device Ma according to the first embodiment, and a correction information storage 61c that stores a predetermined first correspondence relationship is further included in the third embodiment.

The predetermined first correspondence relationship is a correspondence relationship between a measurement output of the correction luminance measurer (B measurement output) and an error E. More specifically, in the third embodiment, the predetermined first correspondence relationship is a B2 correspondence relationship between a measurement output of the correction luminance measurer 4 (B2 measurement output) of a case where only a first light source 11 emits first illumination light and the error E. Such a B2 correspondence relationship is obtained in advance by, for example, in a similar manner to the B1 correspondence relationship described above, actual measurement using a plurality of samples, or simulation using, for example, an optical simulator. In a similar manner to the B1 correspondence relationship, the B2 correspondence relationship obtained in advance by the simulation using the optical simulator is illustrated in FIG. 8 as an example. The B2 correspondence relationship obtained as described above is stored in the correction information storage 61c by a function formula thereof or in a lookup table.

The control processing unit 5c is a circuit for controlling each part of the reflection characteristic measuring device Mc according to a function of each part and obtaining a reflection characteristic of an object of measurement. The control processing unit 5c includes, for example, a CPU and peripheral circuits thereof. The control processing unit 5c functionally includes a control unit 51, a reflection characteristic calculator 52, and the corrector 53c by the control processing program being executed. The control unit 51 and the reflection characteristic calculator 52 according to the third embodiment are similar to the control unit 51 and the reflection characteristic calculator 52 according to the first embodiment, respectively, and descriptions thereof are omitted.

The corrector 53c corrects the reflection characteristic measured by the optical measurers 1 and 2 using the error E caused by light emitted from the object of measurement facing a measurement aperture SA being reflected by a diffuse reflecting surface of an integrating sphere 22 and illuminating the object of measurement facing the measurement aperture SA, and obtains the reflection characteristic of a true value or a value closer to the true value. In the present embodiment, the corrector 53c obtains, from the B2 correspondence relationship, the error E corresponding to the B measurement output of the correction luminance measurer 4 at the time of measuring the object of measurement facing the measurement aperture SA, performs correction using the obtained error E, and obtains a reflection characteristic Sh (gloss value in the present embodiment) of the true value or a value closer to the true value.

Next, operation of the reflection characteristic measuring device Mc according to the third embodiment will be described. First, when a power switch (not illustrated) is turned on, the reflection characteristic measuring device Mc is activated, necessary parts are initialized by the control processing unit 5c, and the control processing program is executed so that the control unit 51, the reflection characteristic calculator 52, and the corrector 53c are functionally configured in the control processing unit 5c.

When a user (operator) inputs an instruction on measurement of the gloss value from the input unit 7, measurement is performed by each unit in FIG. 3 (S1c). More specifically, in the reflection characteristic measuring device Mc, the first light source 11 is turned on by the control unit 51, the B2 measurement output of the correction luminance measurer 4 in this case is obtained and stored in the storage 6c, and a first measurement output of a first measurer 14 in this case is obtained and stored in the storage 6c.

The reflection characteristic measuring device Mc then obtains the error E using the corrector 53c of the control processing unit 5c (S2c). More specifically, the corrector 53c obtains the error E corresponding to the B2 measurement output stored in the storage 6c from the B2 correspondence relationship stored in the correction information storage 61c, and stores it in the storage 6c.

Then, in the reflection characteristic measuring device Mc, in a similar manner to the first embodiment, the corrector 53c corrects a first measurement output Ge before correction stored in the storage 6c using the error E obtained in the processing S2c (G=Ge−E, S3), the reflection characteristic calculator 52 of the control processing unit 5c obtains the gloss value Sh that is one of the reflection characteristic on the basis of a first measurement output G after correction and stores it in the storage 6c (S4), the control unit 51 outputs the obtained gloss value Sh that is one of the reflection characteristic to the output unit 8 (S5), and the process is terminated.

As described above, since the reflection characteristic measuring device Mc according to the third embodiment includes the corrector 53c, even in the case of a device having a plurality of geometries including a diffuse reflecting member (integrating sphere in this case) 22, the error caused by recursive diffused illumination can be reduced.

Further, with the reflection characteristic measuring device Mc according to the third embodiment, correction is performed using the predetermined B2 correspondence relationship such as a relational expression and a lookup table obtained in advance as described above, whereby the error E caused by the recursive diffused illumination can be reduced.

Next, another embodiment will be described.

Fourth Embodiment

Figure 9:
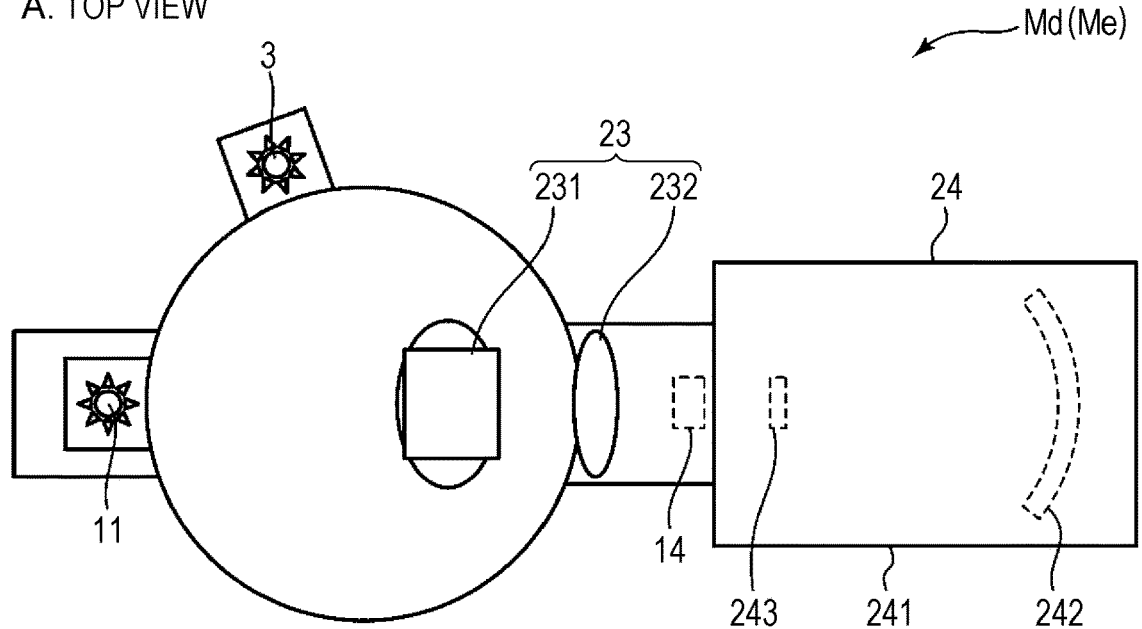
FIG. 9 is a diagram illustrating an optical configuration of the reflection characteristic measuring device according to the fourth and fifth embodiments.
Figure 9:
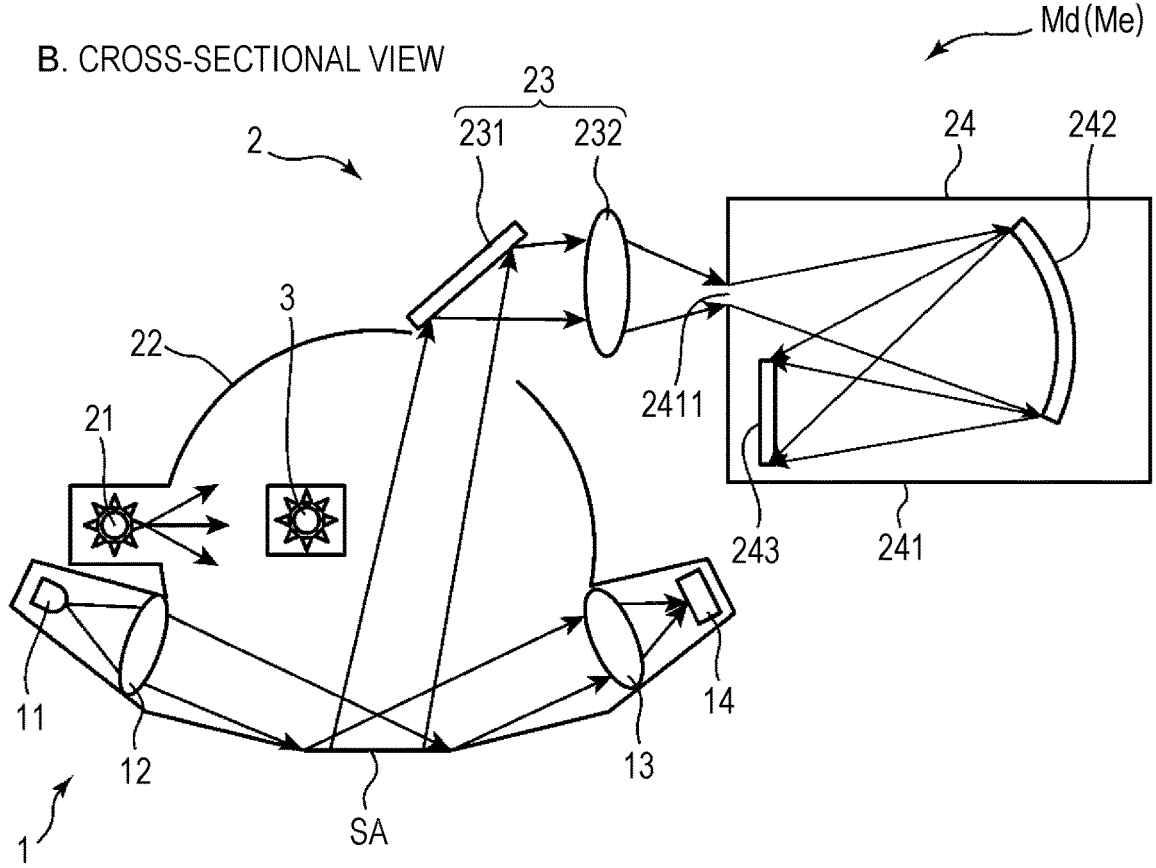
Figure 10:
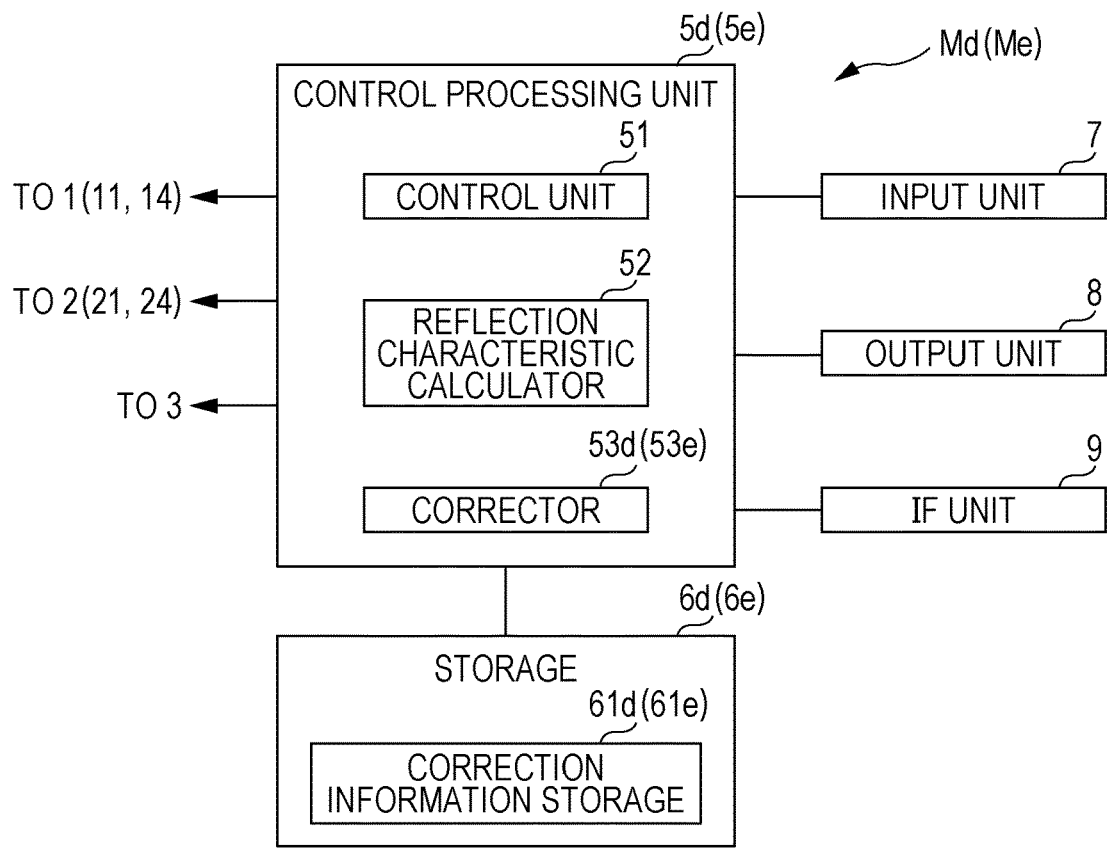
FIG. 10 is a diagram illustrating an electrical configuration of the reflection characteristic measuring device according to the fourth and fifth embodiments.
Figure 11:
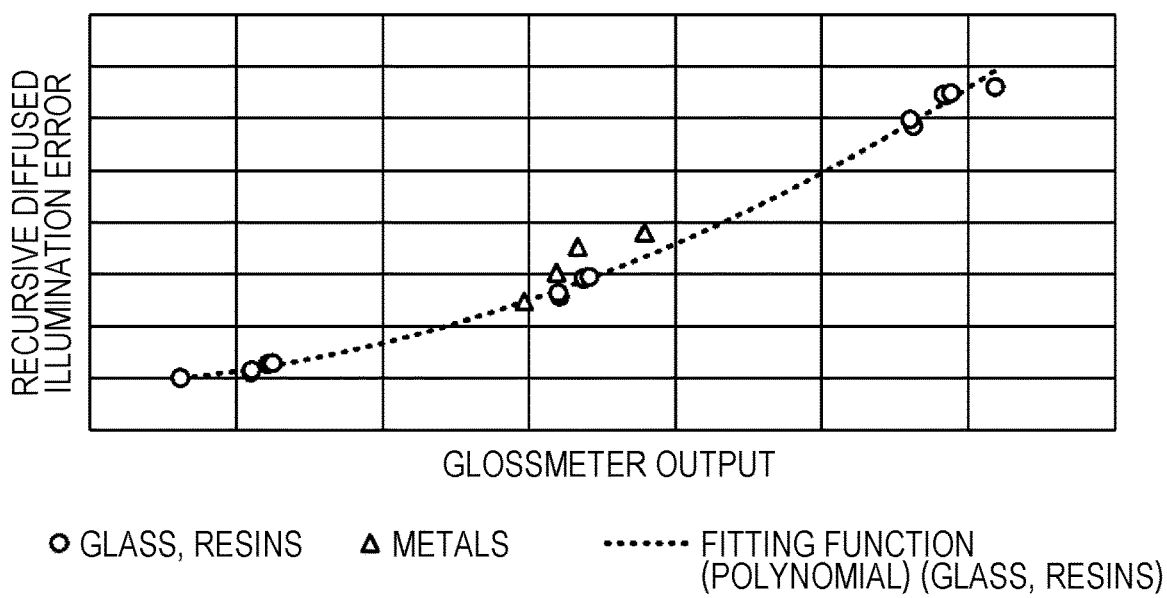
FIG. 11 is a chart for explaining a correspondence relationship for obtaining an error stored in the reflection characteristic measuring device according to the fourth embodiment.

FIG. 9 is a diagram illustrating an optical configuration of a reflection characteristic measuring device according to fourth and fifth embodiments. FIG. 10 is a diagram illustrating an electrical configuration of the reflection characteristic measuring device according to the fourth and fifth embodiments. FIG. 11 is a chart for explaining a correspondence relationship for obtaining an error stored in the reflection characteristic measuring device according to the fourth embodiment.

A reflection characteristic measuring device Md according to the fourth embodiment includes, for example, as illustrated in FIGS. 9 and 10, optical measurers 1 and 2, a correction light source 3, a control processing unit 5d provided with a corrector 53d, and a storage 6d. In the example illustrated in FIGS. 9 and 10, an input unit 7, an output unit 8, and an IF unit 9 are further included. In other words, the reflection characteristic measuring device Md according to the fourth embodiment does not include a correction luminance measurer 4. The optical measurers 1 and 2, the correction light source 3, the input unit 7, the output unit 8, and the IF unit 9 in the reflection characteristic measuring device Md according to the fourth embodiment are similar to the optical measurers 1 and 2, the correction light source 3, the input unit 7, the output unit 8, and the IF unit 9 in the reflection characteristic measuring device Ma according to the first embodiment, respectively, and descriptions thereof are omitted.

The storage 6d functions in a similar manner to the storage 6a in the reflection characteristic measuring device Ma according to the first embodiment, and a correction information storage 61d that stores a predetermined second correspondence relationship is further included in the fourth embodiment.

The predetermined second correspondence relationship is a correspondence relationship between a measurement output of a first measurer 14 (C measurement output) and an error E. More specifically, in the fourth embodiment, the predetermined second correspondence relationship is a C1 correspondence relationship between a measurement output of the first measurer 14 (C1 measurement output) of a case where only the correction light source 3 emits correction illumination light and the error E. Such a C1 correspondence relationship is obtained in advance by, for example, in a similar manner to the B1 correspondence relationship described above, actual measurement using a plurality of samples, or simulation using, for example, an optical simulator. In a similar manner to the B1 correspondence relationship, the C1 correspondence relationship obtained in advance by the simulation using the optical simulator is illustrated in FIG. 11 as an example. The C1 correspondence relationship obtained as described above is stored in the correction information storage 61d by a function formula thereof or in a lookup table.

The control processing unit 5d is a circuit for controlling each part of the reflection characteristic measuring device Md according to a function of each part and obtaining a reflection characteristic of an object of measurement. The control processing unit 5d includes, for example, a CPU and peripheral circuits thereof. The control processing unit 5d functionally includes a control unit 51, a reflection characteristic calculator 52, and the corrector 53d by the control processing program being executed. The control unit 51 and the reflection characteristic calculator 52 according to the fourth embodiment are similar to the control unit 51 and the reflection characteristic calculator 52 according to the first embodiment, and descriptions thereof are omitted.

The corrector 53d corrects the reflection characteristic measured by the optical measurers 1 and 2 using the error E caused by light emitted from the object of measurement facing a measurement aperture SA being reflected by a diffuse reflecting surface of an integrating sphere 22 and illuminating the object of measurement facing the measurement aperture SA, and obtains the reflection characteristic of a true value or a value closer to the true value. In the present embodiment, the corrector 53d obtains, from the C1 correspondence relationship, the error E corresponding to the C measurement output of the first measurer 14 at the time of measuring the object of measurement facing the measurement aperture SA, performs correction using the obtained error E, and obtains a reflection characteristic Sh (gloss value in the present embodiment) of the true value or a value closer to the true value.

Next, operation of the reflection characteristic measuring device Md according to the fourth embodiment will be described. First, when a power switch (not illustrated) is turned on, the reflection characteristic measuring device Md is activated, necessary parts are initialized by the control processing unit 5d, and the control processing program is executed so that the control unit 51, the reflection characteristic calculator 52, and the corrector 53d are functionally configured in the control processing unit 5d.

When a user (operator) inputs an instruction on measurement of the gloss value from the input unit 7, measurement is performed by each unit in FIG. 3 (S1d). More specifically, in the reflection characteristic measuring device Md, only the correction light source 3 is turned on by the control unit 51, and the C measurement output of the first measurer 14 in this case is obtained and stored in the storage 6d. Then, in the reflection characteristic measuring device Md, only a first light source 11 is turned on by the control unit 51, and a first measurement output of the first measurer 14 in this case is obtained and stored in the storage 6d.

The reflection characteristic measuring device Md then obtains the error E using the corrector 53d of the control processing unit 5d (S2d). More specifically, the corrector 53d obtains the error E corresponding to the C measurement output stored in the storage 6d from the C1 correspondence relationship stored in the correction information storage 61d, and stores it in the storage 6d.

Then, in the reflection characteristic measuring device Md, in a similar manner to the first embodiment, the corrector 53d corrects a first measurement output Ge before correction stored in the storage 6d using the error E obtained in the processing S2d (G=Ge−E, S3), the reflection characteristic calculator 52 of the control processing unit 5d obtains the gloss value Sh that is one of the reflection characteristic on the basis of a first measurement output G after correction and stores it in the storage 6c (S4), the control unit 51 outputs the obtained gloss value Sh that is one of the reflection characteristic to the output unit 8 (S5), and the process is terminated.

As described above, since the reflection characteristic measuring device Md according to the fourth embodiment includes the corrector 53d, even in the case of a device having a plurality of geometries including a diffuse reflecting member (integrating sphere in this case) 22, the error caused by recursive diffused illumination can be reduced.

Further, with the reflection characteristic measuring device Md according to the fourth embodiment, correction is performed using the predetermined C1 correspondence relationship such as a relational expression and a lookup table obtained in advance as described above, whereby the error E caused by the recursive diffused illumination can be reduced.

It is preferable that the correction luminance measurer of the reflection characteristic measuring device Md according to the fourth embodiment has spectral sensitivity same as that of the first measurer 14 when the error E is obtained from a first correspondence relationship. In this case, when the error E is obtained from the first correspondence relationship, the corrector 53d multiplies the C measurement output of the first measurer 14 by what is called visibility Vλ (spectral luminous efficiency, corresponding to Y in the XYZ color space) so that the spectral sensitivity of the first measurer 14 is made equal to the spectral sensitivity of the first measurer 14, and the error E corresponding to the C measurement output multiplied by Vλ is obtained from the C1 correspondence relationship. In such a reflection characteristic measuring device Md, since the spectral sensitivity of the first measurer 14 is made equal to the spectral sensitivity of the first measurer 14 when the error E is obtained from the first correspondence relationship, the error E can be obtained more accurately, and the error E caused by the recursive diffused illumination can be further reduced.

Next, another embodiment will be described.

Fifth Embodiment

Figure 12:
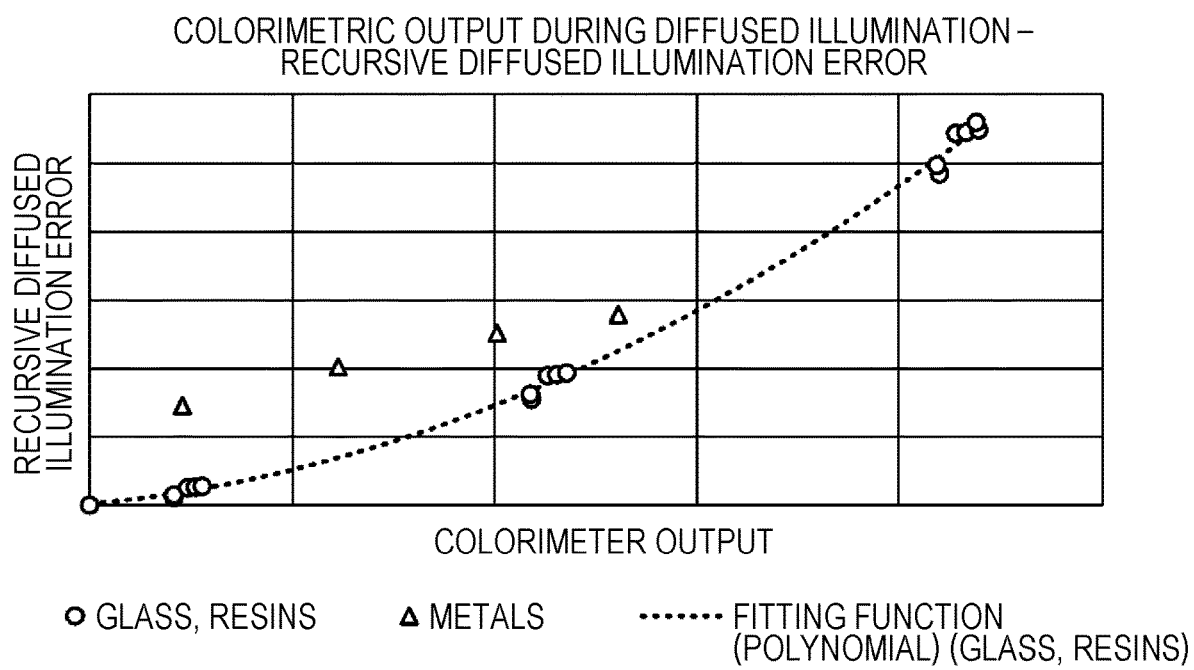
FIG. 12 is a chart for explaining a correspondence relationship for obtaining an error stored in the reflection characteristic measuring device according to the fifth embodiment.

FIG. 12 is a chart for explaining a correspondence relationship for obtaining an error stored in a reflection characteristic measuring device according to a fifth embodiment.

A reflection characteristic measuring device Me according to the fifth embodiment includes, for example, as illustrated in FIGS. 9 and 10, optical measurers 1 and 2, a correction light source 3, a control processing unit 5e provided with a corrector 53e, and a storage 6e. In the example illustrated in FIGS. 9 and 10, an input unit 7, an output unit 8, and an IF unit 9 are further included. In other words, the reflection characteristic measuring device Me according to the fifth embodiment does not include a correction luminance measurer 4. The optical measurers 1 and 2, the correction light source 3, the input unit 7, the output unit 8, and the IF unit 9 in the reflection characteristic measuring device Me according to the fifth embodiment are similar to the optical measurers 1 and 2, the correction light source 3, the input unit 7, the output unit 8, and the IF unit 9 in the reflection characteristic measuring device Ma according to the first embodiment, respectively, and descriptions thereof are omitted.

The storage 6e functions in a similar manner to the storage 6a in the reflection characteristic measuring device Ma according to the first embodiment, and a correction information storage 61e that stores a predetermined second correspondence relationship is further included in the fifth embodiment.

The predetermined second correspondence relationship is a correspondence relationship between a measurement output of a second measurer 24 (D measurement output) and an error E. More specifically, in the fifth embodiment, the predetermined second correspondence relationship is a D1 correspondence relationship between a measurement output of the second measurer 24 (D1 measurement output) of a case where only the correction light source 3 emits correction illumination light and the error E. Such a D1 correspondence relationship is obtained in advance by, for example, in a similar manner to the B1 correspondence relationship described above, actual measurement using a plurality of samples, or simulation using, for example, an optical simulator. In a similar manner to the B1 correspondence relationship, the D1 correspondence relationship obtained in advance by the simulation using the optical simulator is illustrated in FIG. 12 as an example. The D1 correspondence relationship obtained as described above is stored in the correction information storage 61e by a function formula thereof or in a lookup table.

The control processing unit 5e is a circuit for controlling each part of the reflection characteristic measuring device Me according to a function of each part and obtaining a reflection characteristic of an object of measurement. The control processing unit 5e includes, for example, a CPU and peripheral circuits thereof. The control processing unit 5e functionally includes a control unit 51, a reflection characteristic calculator 52, and the corrector 53e by the control processing program being executed. The control unit 51 and the reflection characteristic calculator 52 according to the fifth embodiment are similar to the control unit 51 and the reflection characteristic calculator 52 according to the first embodiment, respectively, and descriptions thereof are omitted.

The corrector 53e corrects the reflection characteristic measured by the optical measurers 1 and 2 using the error E caused by light emitted from the object of measurement facing a measurement aperture SA being reflected by a diffuse reflecting surface of an integrating sphere 22 and illuminating the object of measurement facing the measurement aperture SA, and obtains the reflection characteristic of a true value or a value closer to the true value. In the present embodiment, the corrector 53e obtains, from the D1 correspondence relationship, the error E corresponding to the D measurement output of the second measurer 24 at the time of measuring the object of measurement facing the measurement aperture SA, performs correction using the obtained error E, and obtains a reflection characteristic Sh (gloss value in the present embodiment) of the true value or a value closer to the true value.

Next, operation of the reflection characteristic measuring device Me according to the fifth embodiment will be described. First, when a power switch (not illustrated) is turned on, the reflection characteristic measuring device Me is activated, necessary parts are initialized by the control processing unit 5e, and the control processing program is executed so that the control unit 51, the reflection characteristic calculator 52, and the corrector 53e are functionally configured in the control processing unit 5e.

When a user (operator) inputs an instruction on measurement of the gloss value from the input unit 7, measurement is performed by each unit in FIG. 3 (S1e). More specifically, in the reflection characteristic measuring device Me, only the correction light source 3 is turned on by the control unit 51, and the D1 measurement output of the second measurer 24 in this case is obtained and stored in the storage 6e. Then, in the reflection characteristic measuring device Me, only a first light source 11 is turned on by the control unit 51, and a first measurement output of the first measurer 14 in this case is obtained and stored in the storage 6e.

The reflection characteristic measuring device Me then obtains the error E using the corrector 53e of the control processing unit 5e (S2e). More specifically, the corrector 53e obtains the error E corresponding to the D1 measurement output stored in the storage 6e from the D1 correspondence relationship stored in the correction information storage 61e, and stores it in the storage 6e.

Then, in the reflection characteristic measuring device Me, in a similar manner to the first embodiment, the corrector 53e corrects a first measurement output Ge before correction stored in the storage 6e using the error E obtained in the processing S2e (G=Ge−E, S3), the reflection characteristic calculator 52 of the control processing unit 5e obtains the gloss value Sh that is one of the reflection characteristic on the basis of a first measurement output G after correction and stores it in the storage 6e (S4), the control unit 51 outputs the obtained gloss value Sh that is one of the reflection characteristic to the output unit 8 (S5), and the process is terminated.

As described above, since the reflection characteristic measuring device Me according to the fifth embodiment includes the corrector 53e, even in the case of a device having a plurality of geometries including a diffuse reflecting member (integrating sphere in this case) 22, the error caused by recursive diffused illumination can be reduced.

Further, with the reflection characteristic measuring device Me according to the fifth embodiment, correction is performed using the predetermined D1 correspondence relationship such as a relational expression and a lookup table obtained in advance as described above, whereby the error E caused by the recursive diffused illumination can be reduced.

Next, another embodiment will be described.

Sixth Embodiment

Figure 13:
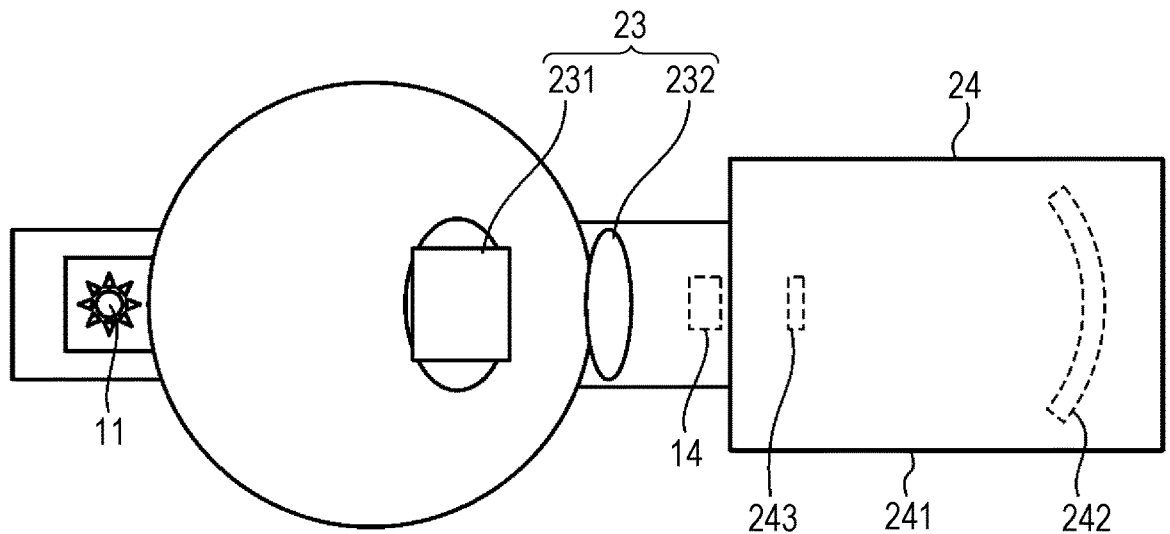
FIG. 13 is a diagram illustrating an optical configuration of the reflection characteristic measuring device according to the sixth embodiment.
Figure 13:
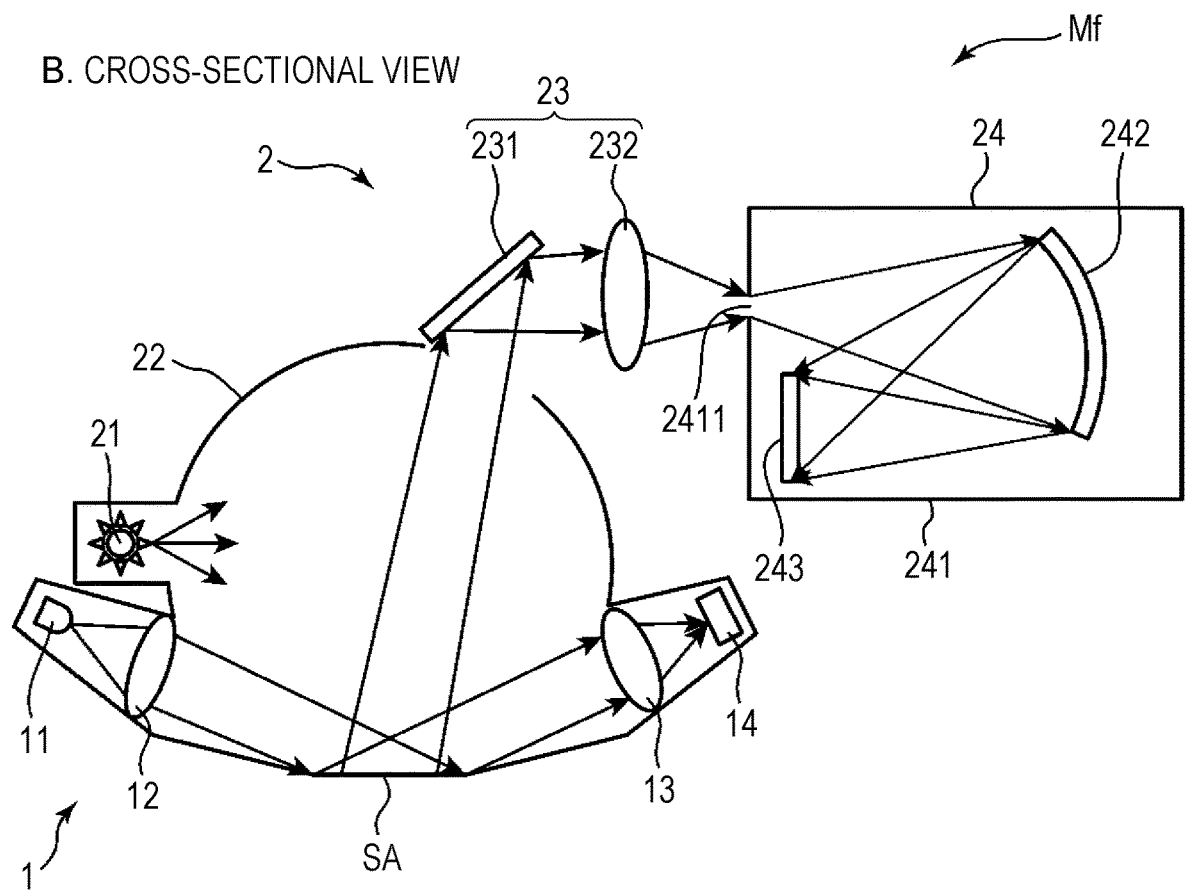
Figure 14:
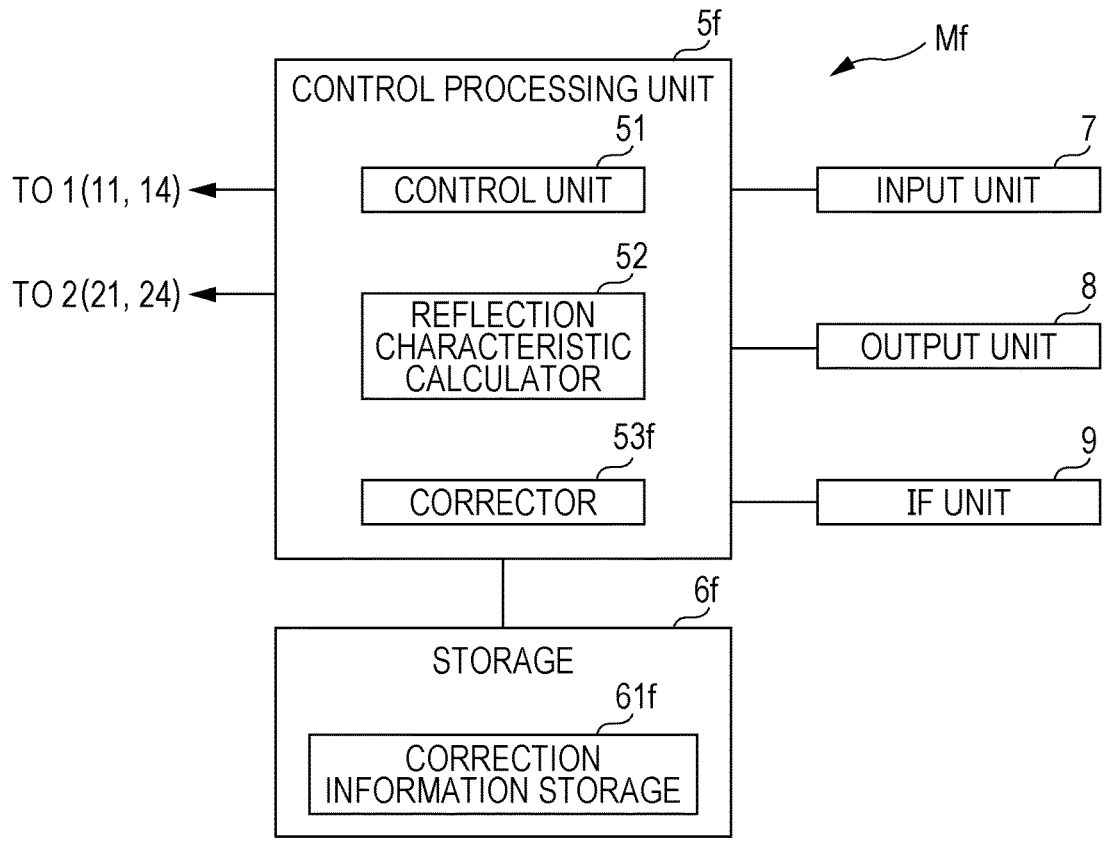
FIG. 14 is a diagram illustrating an electrical configuration of the reflection characteristic measuring device according to the sixth embodiment.
Figure 15:
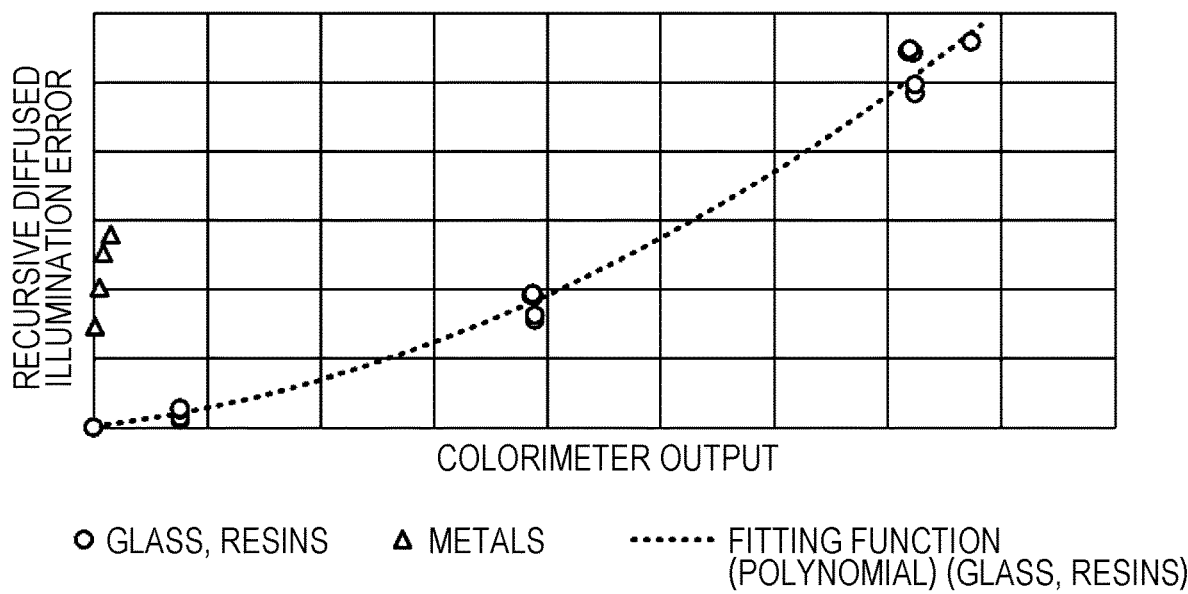
FIG. 15 is a chart for explaining a correspondence relationship for obtaining an error stored in the reflection characteristic measuring device according to the sixth embodiment.

FIG. 13 is a diagram illustrating an optical configuration of a reflection characteristic measuring device according to a sixth embodiment. FIG. 14 is a diagram illustrating an electrical configuration of the reflection characteristic measuring device according to the sixth embodiment. FIG. 15 is a chart for explaining a correspondence relationship for obtaining an error stored in the reflection characteristic measuring device according to a sixth embodiment.

A reflection characteristic measuring device Mf according to the sixth embodiment includes, for example, as illustrated in FIGS. 13 and 14, optical measurers 1 and 2, a control processing unit 5f provided with a corrector 53f, and a storage 6f. In the example illustrated in FIGS. 13 and 14, an input unit 7, an output unit 8, and an IF unit 9 are further included. In other words, the reflection characteristic measuring device Mf according to the sixth embodiment does not include a correction light source 3 and a correction luminance measurer 4. The optical measurers 1 and 2, the input unit 7, the output unit 8, and the IF unit 9 in the reflection characteristic measuring device Mf according to the sixth embodiment are similar to the optical measurers 1 and 2, the input unit 7, the output unit 8, and the IF unit 9 in the reflection characteristic measuring device Ma according to the first embodiment, respectively, and descriptions thereof are omitted.

The storage 6f functions in a similar manner to the storage 6a in the reflection characteristic measuring device Ma according to the first embodiment, and a correction information storage 61f that stores a predetermined second correspondence relationship is further included in the sixth embodiment.

The predetermined second correspondence relationship is a correspondence relationship between a measurement output of a second measurer 24 (D measurement output) and an error E. More specifically, in the sixth embodiment, the predetermined second correspondence relationship is a D2 correspondence relationship between a measurement output of the second measurer 24 (D2 measurement output) of a case where only a first light source 11 emits first illumination light and the error E. Such a D2 correspondence relationship is obtained in advance by, for example, in a similar manner to the B1 correspondence relationship described above, actual measurement using a plurality of samples, or simulation using, for example, an optical simulator. In a similar manner to the B1 correspondence relationship, the D2 correspondence relationship obtained in advance by the simulation using the optical simulator is illustrated in FIG. 15 as an example. The D2 correspondence relationship obtained as described above is stored in the correction information storage 61f by a function formula thereof or in a lookup table.

The control processing unit 5f is a circuit for controlling each part of the reflection characteristic measuring device Mf according to a function of each part and obtaining a reflection characteristic of an object of measurement. The control processing unit 5f includes, for example, a CPU and peripheral circuits thereof. The control processing unit 5f functionally includes a control unit 51, a reflection characteristic calculator 52, and the corrector 53f by the control processing program being executed. The control unit 51 and the reflection characteristic calculator 52 according to the sixth embodiment are similar to the control unit 51 and the reflection characteristic calculator 52 according to the first embodiment, respectively, and descriptions thereof are omitted.

The corrector 53f corrects the reflection characteristic measured by the optical measurers 1 and 2 using the error E caused by light emitted from the object of measurement facing a measurement aperture SA being reflected by a diffuse reflecting surface of an integrating sphere 22 and illuminating the object of measurement facing the measurement aperture SA, and obtains the reflection characteristic of a true value or a value closer to the true value. In the present embodiment, the corrector 53*f* obtains, from the D2 correspondence relationship, the error E corresponding to the D measurement output of the second measurer 24 at the time of measuring the object of measurement facing the measurement aperture SA, performs correction using the obtained error E, and obtains a reflection characteristic Sh (gloss value in the present embodiment) of the true value or a value closer to the true value.

Next, operation of the reflection characteristic measuring device Mf according to the sixth embodiment will be described. First, when a power switch (not illustrated) is turned on, the reflection characteristic measuring device Mf is activated, necessary parts are initialized by the control processing unit 5*f*, and the control processing program is executed so that the control unit 51, the reflection characteristic calculator 52, and the corrector 53*f* are functionally configured in the control processing unit 5*f*.

When a user (operator) inputs an instruction on measurement of the gloss value from the input unit 7, measurement is performed by each unit in FIG. 3 (S1*f*). More specifically, in the reflection characteristic measuring device Mf, a first light source 11 is turned on by the control unit 51, the D2 measurement output of the second measurer 24 in this case is obtained and stored in the storage 6*f*, and a first measurement output of a first measurer 14 in this case is obtained and stored in the storage 6*f*.

The reflection characteristic measuring device Mf then obtains the error E using the corrector 53*f* of the control processing unit 5*f* (S2*f*). More specifically, the corrector 53*f* obtains the error E corresponding to the D2 measurement output stored in the storage 6*f* from the D2 correspondence relationship stored in the correction information storage 61*f*, and stores it in the storage 6*f*.

Then, in the reflection characteristic measuring device Mf, in a similar manner to the first embodiment, the corrector 53*f* corrects a first measurement output Ge before correction stored in the storage 6*f* using the error E obtained in the processing S2*f* (G=Ge−E, S3), the reflection characteristic calculator 52 of the control processing unit 5*f* obtains the gloss value Sh that is one of the reflection characteristic on the basis of a first measurement output G after correction and stores it in the storage 6*f* (S4), the control unit 51 outputs the obtained gloss value Sh that is one of the reflection characteristic to the output unit 8 (S5), and the process is terminated.

As described above, since the reflection characteristic measuring device Mf according to the sixth embodiment includes the corrector 53*f*, even in the case of a device having a plurality of geometries including a diffuse reflecting member (integrating sphere in this case) 22, the error caused by recursive diffused illumination can be reduced.

Further, with the reflection characteristic measuring device Mf according to the sixth embodiment, correction is performed using the predetermined D2 correspondence relationship such as a relational expression and a lookup table obtained in advance as described above, whereby the error E caused by the recursive diffused illumination can be reduced.

It is preferable that the second measurer 24 of the reflection characteristic measuring devices Me and Mf according to the fifth and sixth embodiments has spectral sensitivity same as that of the first measurer 14 when the error E is obtained from the second correspondence relationship. In this case, when the error E is obtained from the second correspondence relationship, the corrector 53*e* multiplies the D1 measurement output of the second measurer 24 by what is called visibility Vλ (spectral luminous efficiency, corresponding to Y in the XYZ color space) so that the spectral sensitivity of the second measurer 24 is made equal to the spectral sensitivity of the first measurer 14, and the error E corresponding to the D1 measurement output multiplied by Vλ is obtained from the D1 correspondence relationship. When the error E is obtained from the second correspondence relationship, the corrector 53*f* multiplies the D2 measurement output of the second measurer 24 by the visibility Vλ so that the spectral sensitivity of the second measurer 24 is made equal to the spectral sensitivity of the first measurer 14, and the error E corresponding to the D2 measurement output multiplied by Vλ is obtained from the D2 correspondence relationship. In such reflection characteristic measuring devices Me and Mf, since the spectral sensitivity of the second measurer 24 is made equal to the spectral sensitivity of the first measurer 14 when the error E is obtained from the second correspondence relationship, the error E can be obtained more accurately, and the error E caused by the recursive diffused illumination can be further reduced.

Although the present description discloses techniques of various aspects as described above, main techniques thereof will be summarized below.

A reflection characteristic measuring device according to an aspect includes an optical measurer that includes a measurement aperture and measures, using a plurality of optical systems having mutually different geometries, a plurality of mutually different types of reflection characteristics by irradiating an object of measurement facing the measurement aperture with measurement light and receiving the reflected light. The optical measurer includes a diffuse reflecting member having a diffuse reflecting surface that performs diffuse reflection in at least one of the plurality of optical systems. The reflection characteristic measuring device further includes a corrector that corrects the reflection characteristic measured by the optical measurer using an error generated by light emitted from the object of measurement facing the measurement aperture being reflected by the diffuse reflecting surface and illuminating the object of measurement facing the measurement aperture. In the reflection characteristic measuring device described above, the diffuse reflecting member is preferably an integrating sphere. In the reflection characteristic measuring device described above, the optical measurer preferably includes a first light source that emits first illumination light, a first optical system including a first illumination optical system into which the first illumination light emitted from the first light source unit is made incident and illuminates the object of measurement facing the measurement aperture with the first illumination light from a single direction and a first light receiving optical system that receives a first reflected light of the first illumination light reflected by the object of measurement from a single direction, a first measurer that measures the first reflected light of the first illumination light emitted from the first light receiving optical system, and a gloss calculation unit that obtains a gloss value as the reflection characteristic on the basis of a first measurement output of the first measurer. In the reflection characteristic measuring device described above, the optical measurer preferably includes a second light source that emits second illumination light for illuminating the diffuse reflecting surface, a second optical system including a second illumination optical system into which the second illumination light emitted from the second light source with is made incident and illuminates the object of measurement facing the measurement aperture with diffused light of the second illumination light diffusely reflected by the diffuse reflecting surface and a second light receiving optical system that receives second reflected light of the diffused light reflected by the object of measurement, a second measurer that spectroscopically measures the second reflected light of the diffused light emitted from the second light receiving optical system, and a spectroscopic calculation unit that obtains a spectral reflectance as the reflection characteristic on the basis of a second measurement output of the second measurer.

Since such a reflection characteristic measuring device includes the corrector, errors caused by recursive diffused illumination can be reduced in the reflection characteristic measuring device including a diffuse reflecting member and having a plurality of geometries.

The above-described reflection characteristic measuring device according to another aspect further includes a correction light source that emits correction illumination light for illuminating the diffuse reflecting surface, and a correction luminance measurer that measures luminance of the diffuse reflecting surface, in which the optical measurer includes a first light source that emits first illumination light, a first optical system including a first illumination optical system into which the first illumination light emitted from the first light source unit is made incident and illuminates the object of measurement facing the measurement aperture with the first illumination light from a single direction and a first light receiving optical system that receives a first reflected light of the first illumination light reflected by the object of measurement from a single direction, a first measurer that measures the first reflected light of the first illumination light emitted from the first light receiving optical system, and a reflection characteristic calculator that obtains the reflection characteristic on the basis of a first measurement output of the first measurer, the corrector obtains the error (E) on the basis of an A1 measurement output (Bc) of the correction luminance measurer of a case where only the correction light source emits the correction illumination light, an A2 measurement output (B) of the correction luminance measurer of a case where only the first light source emits the first illumination light, and an A3 measurement output (Gd) of the first measurer of a case where only the correction light source emits the correction illumination light, and corrects the first measurement output (Ge) of the first measurer of a case where only the first light source emits the first illumination light using the obtained error (E), and the reflection characteristic calculator obtains the reflection characteristic (Sh) on the basis of the corrected first measurement output (Ge) of the first measurer.

Such a reflection characteristic measuring device is capable of performing correction by theoretical considerations and reducing errors caused by the recursive diffused illumination.

The above-described reflection characteristic measuring device according to another aspect further includes a correction luminance measurer that measures luminance of the diffuse reflecting surface, and a first correction information storage that stores first correspondence relationship between B measurement output of the correction luminance measurer and the error, in which the corrector obtains the error corresponding to the B measurement output of the correction luminance measurer at the time of measuring the object of measurement facing the measurement aperture from the first correspondence relationship, and corrects the reflection characteristic measured by the optical measurer using the obtained error. Preferably, in the reflection characteristic measuring device described above, a correction light source that emits correction illumination light for illuminating the diffuse reflecting surface is further included, and the optical measurer includes a first light source that emits first illumination light, a first optical system including a first illumination optical system into which the first illumination light emitted from the first light source with is made incident and illuminates the object of measurement facing the measurement aperture with the first illumination light from a single direction and a first light receiving optical system that receives a first reflected light of the first illumination light reflected by the object of measurement from a single direction, a first measurer that measures the first reflected light of the first illumination light emitted from the first light receiving optical system, and a gloss calculation unit that obtains a gloss value as the reflection characteristic on the basis of a first measurement output of the first measurer, and the first correction information storage stores a B1 correspondence relationship between a B1 measurement output of the correction luminance measurer of a case where only the correction light source emits the correction illumination light and the error as the first correspondence relationship. Preferably, in the reflection characteristic measuring device described above, the optical measurer includes the first light source that emits the first illumination light, the first optical system including the first illumination optical system into which the first illumination light emitted from the first light source is made incident and illuminates the object of measurement facing the measurement aperture with the first illumination light from a single direction and the first light receiving optical system that receives the first reflected light of the first illumination light reflected by the object of measurement from a single direction, the first measurer that measures the first reflected light of the first illumination light emitted from the first light receiving optical system, and the gloss calculation unit that obtains the gloss value as the reflection characteristic on the basis of the first measurement output of the first measurer, and the first correction information storage stores a B2 correspondence relationship between a B2 measurement output of the correction luminance measurer of a case where only the first light source emits the first illumination light and the error as the first correspondence relationship. Preferably, in the reflection characteristic measuring device described above, the correction luminance measurer has spectral sensitivity same as spectral sensitivity of the first measurer at the time of obtaining the error from the first correspondence relationship.

With such a reflection characteristic measuring device, correction is performed using the predetermined first correspondence relationship such as a relational expression and a lookup table obtained in advance, whereby the error caused by the recursive diffused illumination can be reduced.

The above-described reflection characteristic measuring device according to another aspect further includes a correction light source that emits correction illumination light for illuminating the diffuse reflecting surface, and a second correction information storage that stores a second correspondence relationship between a C measurement output of the first measurer or a D measurement output of the second measurer and the error, in which the optical measurer includes a first light source that emits first illumination light, a first optical system including a first illumination optical system into which the first illumination light emitted from the first light source is made incident and illuminates the object of measurement facing the measurement aperture with the first illumination light from a single direction and a first light receiving optical system that receives a first reflected light of the first illumination light reflected by the object of measurement from a single direction, a first measurer that measures the first reflected light of the first illumination light emitted from the first light receiving optical system, a second light source that emits second illumination light for illuminating the diffuse reflecting surface, a second optical system including a second illumination optical system into which the second illumination light emitted from the second light source unit is made incident and illuminates the object of measurement facing the measurement aperture with diffused light of the second illumination light diffusely reflected by the diffuse reflecting surface and a second light receiving optical system that receives second reflected light of the diffused light reflected by the object of measurement, and a second measurer that measures the second reflected light of the diffused light emitted from the second light receiving optical system, and the corrector obtains the error corresponding to the C measurement output of the first measurer or the D measurement output of the second measurer at the time of measuring the object of measurement facing the measurement aperture from the second correspondence relationship, and corrects the reflection characteristic measured by the optical measurer using the obtained error. In the reflection characteristic measuring device described above, the correction light source preferably also serves as the second light source. Preferably, in the reflection characteristic measuring device described above, the optical measurer further includes a reflection characteristic calculator that obtains a first type of the reflection characteristic on the basis of the first measurement output of the first measurer and obtains a second type of the reflection characteristic different from the first type on the basis of the second measurement output of the second measurer, and the corrector corrects the first measurement output of the first measurer using the obtained error. Preferably, in the reflection characteristic measuring device described above, the second correction information storage stores a C1 correspondence relationship between a C1 measurement output of the first measurer of a case where only the correction light source emits the correction illumination light and the error as the second correspondence relationship. Preferably, in the reflection characteristic measuring device described above, the second correction information storage stores a D1 correspondence relationship between a D1 measurement output of the second measurer of a case where only the correction light source emits the correction illumination light and the error as the second correspondence relationship. Preferably, in the reflection characteristic measuring device described above, the second correction information storage stores a D2 correspondence relationship between a D2 measurement output of the second measurer of a case where only the first light source emits the first illumination light and the error as the second correspondence relationship.

With such a reflection characteristic measuring device, correction is performed using the predetermined second correspondence relationship such as a relational expression and a lookup table obtained in advance, whereby the error caused by the recursive diffused illumination can be reduced.

In the above-described reflection characteristic measuring device according to another aspect, the second measurer has spectral sensitivity same as spectral sensitivity of the first measurer at the time of obtaining the error from the second correspondence relationship.

In such a reflection characteristic measuring device, since the spectral sensitivity of the second measurer is made equal to the spectral sensitivity of the first measurer when the error E is obtained from the second correspondence relationship, the error can be obtained more accurately, and the error caused by the recursive diffused illumination can be further reduced.

In the above-described reflection characteristic measuring device according to another aspect, the correction luminance measurer has the spectral sensitivity same as the spectral sensitivity of the first measurer at the time of obtaining the error from the first correspondence relationship.

In such a reflection characteristic measuring device, since the spectral sensitivity of the correction luminance measurer is made equal to the spectral sensitivity of the first measurer when the error E is obtained from the first correspondence relationship, the error can be obtained more accurately, and the error caused by the recursive diffused illumination can be further reduced.

The present application is based on JP 2016-108282 A filed on May 31, 2016, the contents of which are included in the present application.

It should be noted that, although the present invention has been described appropriately and sufficiently through the embodiments with reference to the accompanying drawings in the foregoing, those skilled in the art may readily modify and/or improve the embodiments described above. Therefore, as long as variations or modifications made by those skilled in the art are of a level that does not depart from the scope of the claims set forth in the claims, it is interpreted that the variations or modifications are included in the scope of the claims.

INDUSTRIAL APPLICABILITY

According to the present invention, a reflection characteristic measuring device that illuminates an object of measurement, which is an object to be measured, and measures its reflection characteristic can be provided.

The invention claimed is:

1. A reflection characteristic measuring device, comprising:
an optical measurer that includes a measurement aperture and illuminates, using a plurality of optical systems having mutually different geometries, an object of measurement facing the measurement aperture with measurement light and receives reflected light of the measurement light to measure a plurality of mutually different types of reflection characteristics, the optical measurer including a diffuse reflecting member having a diffuse reflecting surface that performs diffuse reflection in at least one of the plurality of optical systems;
a corrector that corrects the reflection characteristic measured by the optical measurer using an error caused by light emitted from the object of measurement facing the measurement aperture being reflected by the diffuse reflecting surface and illuminating the object of measurement facing the measurement aperture;
the optical measurer includes: a first light source that emits first illumination light; a first optical system including a first illumination optical system into which the first illumination light emitted from the first light source is made incident and which illuminates the object of measurement facing the measurement aperture with the first illumination light from a single direction and a first light receiving optical system that receives a first reflected light of the first illumination light reflected by the object of measurement from a single direction; a first measurer that measures the first reflected light of the first illumination light passed through the first light receiving optical system; and a reflection characteristic calculator that obtains the reflection characteristic on the basis of a first measurement output of the first measurer;

the corrector corrects the first measurement output of the first measurer of a case where only the first light source emits the first illumination light using the obtained error; and the reflection characteristic calculator obtains the reflection characteristic on the basis of the corrected first measurement output of the first measurer.

2. The reflection characteristic measuring device according to claim 1, further comprising:

a correction luminance measurer that measures luminance of the diffuse reflecting surface; and a first correction information storage that stores first correspondence relationship between B measurement output of the correction luminance measurer and the error, wherein the corrector obtains the error corresponding to the B measurement output of the correction luminance measurer at the time of measuring the object of measurement facing the measurement aperture from the first correspondence relationship, and corrects the reflection characteristic measured by the optical measurer using the obtained error.

3. The reflection characteristic measuring device according to claim 2, wherein the correction luminance measurer has spectral sensitivity same as spectral sensitivity of the first measurer at the time of obtaining the error from the first correspondence relationship.

4. The reflection characteristic measuring device according to claim 1, further comprising:

a correction light source that emits correction illumination light for illuminating the diffuse reflecting surface; and a second correction information storage that stores a second correspondence relationship between a C measurement output of the first measurer or a D measurement output of the second measurer and the error, wherein the optical measurer further includes: a second light source that emits second illumination light for illuminating the diffuse reflecting surface; a second optical system including a second illumination optical system into which the second illumination light emitted from the second light source is made incident and illuminates the object of measurement facing the measurement aperture with diffused light of the second illumination light diffusely reflected by the diffuse reflecting surface and a second light receiving optical system that receives second reflected light of the diffused light reflected by the object of measurement; and a second measurer that measures the second reflected light of the diffused light emitted from the second light receiving optical system, and the corrector obtains the error corresponding to the C measurement output of the first measurer or the D measurement output of the second measurer at the time of measuring the object of measurement facing the measurement aperture from the second correspondence relationship, and corrects the reflection characteristic measured by the optical measurer using the obtained error.

5. The reflection characteristic measuring device according to claim 4, wherein the second measurer has spectral sensitivity same as spectral sensitivity of the first measurer at the time of obtaining the error from the second correspondence relationship.

6. A reflection characteristic measuring device, comprising:

an optical measurer that includes a measurement aperture and illuminates, using a plurality of optical systems having mutually different geometries, an object of measurement facing the measurement aperture with measurement light and receives reflected light of the measurement light to measure a plurality of mutually different types of reflection characteristics, the optical measurer including a diffuse reflecting member having a diffuse reflecting surface that performs diffuse reflection in at least one of the plurality of optical systems;

a corrector that corrects the reflection characteristic measured by the optical measurer using an error caused by light emitted from the object of measurement facing the measurement aperture being reflected by the diffuse reflecting surface and illuminating the object of measurement facing the measurement aperture;

a correction light source that emits correction illumination light for illuminating the diffuse reflecting surface; and a correction luminance measurer that measures luminance of the diffuse reflecting surface, wherein the optical measurer includes: a first light source that emits first illumination light; a first optical system including a first illumination optical system into which the first illumination light emitted from the first light source is made incident and illuminates the object of measurement facing the measurement aperture with the first illumination light from a single direction and a first light receiving optical system that receives a first reflected light of the first illumination light reflected by the object of measurement from a single direction; a first measurer that measures the first reflected light of the first illumination light emitted from the first light receiving optical system; and a reflection characteristic calculator that obtains the reflection characteristic on the basis of a first measurement output of the first measurer, the corrector obtains the error on the basis of an A1 measurement output of the correction luminance measurer of a case where only the correction light source emits the correction illumination light, an A2 measurement output of the correction luminance measurer of a case where only the first light source emits the first illumination light, and an A3 measurement output of the first measurer of a case where only the correction light source emits the correction illumination light, and corrects the first measurement output of the first measurer of a case where only the first light source emits the first illumination light using the obtained error, and the reflection characteristic calculator obtains the reflection characteristic on the basis of the corrected first measurement output of the first measurer.

7. A reflection characteristic measuring device, comprising:

an optical measurer that includes a measurement aperture and illuminates, using a plurality of optical systems having mutually different geometries, an object of measurement facing the measurement aperture with measurement light and receives reflected light of the measurement light to measure a plurality of mutually different types of reflection characteristics, wherein the optical measurer includes:

a diffuse reflecting member having a diffuse reflecting surface that performs diffuse reflection in at least one of the plurality of optical systems;

an error acquirer that obtains an error caused by light emitted from the object of measurement facing the measurement aperture being reflected by the diffuse reflecting surface and illuminating the object of measurement facing the measurement aperture; and a corrector that corrects the reflection characteristic measured by the optical measurer using the error obtained by the error acquirer;

the optical measurer includes: a first light source that emits first illumination light; a first optical system including a first illumination optical system into which the first illumination light emitted from the first light source is made incident and which illuminates the object of measurement facing the measurement aperture with the first illumination light from a single direction and a first light receiving optical system that receives a first reflected light of the first illumination light reflected by the object of measurement from a single direction; a first measurer that measures the first reflected light of the first illumination light passed through the first light receiving optical system; and a reflection characteristic calculator that obtains the reflection characteristic on the basis of a first measurement output of the first measurer;

the corrector corrects the first measurement output of the first measurer of a case where only the first light source emits the first illumination light using the obtained error; and the reflection characteristic calculator obtains the reflection characteristic on the basis of the corrected first measurement output of the first measurer.

8. The reflection characteristic measuring device according to claim 7, further comprising:

a correction luminance measurer that measures a luminance of the diffuse reflecting surface; and a first correction information storage that stores a first correspondence relationship between a B measurement output of the correction luminance measurer and the error, wherein the error acquirer obtains the error from the first correction information storage, and the corrector using the error obtained by the error acquirer.

9. The reflection characteristic measuring device according to claim 8, wherein the correction luminance measurer has a spectral sensitivity the same as a spectral sensitivity of the first measurer at the time of obtaining the error from the first correspondence relationship.

10. The reflection characteristic measuring device according to claim 7, further comprising:

a second correction information storage that stores a second correspondence relationship between a C measurement output of the first measurer or a D measurement output of the second measurer and the error, wherein the optical measurer further includes:

a second light source that emits second illumination light for illuminating the diffuse reflecting surface;

a second optical system including a second illumination optical system into which the second illumination light emitted from the second light source is made incident and illuminates the object of measurement facing the measurement aperture with diffused light of the second illumination light diffusely reflected by the diffuse reflecting surface, and a second light receiving optical system that receives second reflected light of the diffused light reflected by the object of measurement; and a second measurer that measures the second reflected light of the diffused light emitted from the second light receiving optical system, the error acquirer obtains the error from the first correction information storage, and the corrector corrects the reflection characteristic measured by the optical measurer using the error obtained by the error acquirer.

11. The reflection characteristic measuring device according to claim 10, wherein the second measurer has a spectral sensitivity the same as a spectral sensitivity of the first measurer at the time of obtaining the error from the second correspondence relationship.

* * * * *